US005333117A

United States Patent [19]

Ha et al.

[11] Patent Number: 5,333,117

[45] Date of Patent: Jul. 26, 1994

[54] PARALLEL MSD ARITHMETIC USING AN OPTO-ELECTRONIC SHARED CONTENT-ADDRESSABLE MEMORY PROCESSOR

[75] Inventors: Berlin Ha, New York, N.Y.; Yao Li, Monmouth Junction, N.J.

[73] Assignee: NEC Research Institute, Inc., Princeton, N.J.

[21] Appl. No.: 131,146

[22] Filed: Oct. 4, 1993

[51] Int. Cl.[5] ..................... G06E 1/04; G06F 7/00

[52] U.S. Cl. ..................... 364/713; 364/746.2

[58] Field of Search ..................... 364/713, 746.2, 841, 364/845; 359/107, 108

[56] References Cited

U.S. PATENT DOCUMENTS 4,318,581 3/1982 Guest et al. ..................... 364/713 X
4,838,646 6/1989 Lasher et al. ..................... 364/713 X
4,863,247 9/1989 Lasher et al. ..................... 364/713 X
4,864,524 9/1989 Guilfoyle et al. ..................... 364/713
4,892,370 1/1990 Lee ..................... 359/107 X

OTHER PUBLICATIONS

Yao Li et al., "Content-addressable-memory-based single-stage optical modified-signed-digit arithmetic", Optical Letters, vol. 14, No. 22, pp. 1254–1256, Nov. 1989.

*Primary Examiner*—Tan V. Mai
*Attorney, Agent, or Firm*—Philip J. Feig

[57] ABSTRACT

An opto-electronic shared content-addressable memory processor is used to perform parallel modified signed-digit (MSD) arithmetic operations. The MSD arithmetic operation (addition or subtraction of two N-bit numbers) is decomposed into a matrix-matrix multiplication followed by a combination of a threshold and logic operations.

15 Claims, 17 Drawing Sheets

FOR " 1 " FOR " $\overline{1}$ "

FOR " 1 " FOR " $\overline{1}$ "

FOR " 1 " FOR " $\overline{1}$ "

FOR " 1 " FOR " $\overline{1}$ "

PARALLEL MSD ARITHMETIC USING AN OPTO-ELECTRONIC SHARED CONTENT-ADDRESSABLE MEMORY PROCESSOR

BACKGROUND OF INVENTION

The present invention relates to optical modified signed-digit (MSD) arithmetic processing and specifically, to the use of an opto-electronic shared content-addressable memory processor in parallel MSD arithmetic computation. More specifically, MSD arithmetic operations (addition or subtraction of two N-bit numbers) is decomposed into a matrix-matrix multiplication step followed by a combination of a threshold and logic operations.

Addition is the most fundamental operation for any arithmetic computation. Other important arithmetic operations, such as subtraction, multiplication and division, can all be realized through additions together with logic operations. Optical computing will not become widespread until optical technology provides convincing evidence showing that basic arithmetic computations such as additions can be efficiently performed. Using a binary number system, addition speed is inevitably limited by the employed carry propagation scheme. Different methods of advancing carries have been proposed, which include the use of carry look-ahead and carry-save addition approaches. However, the sequential nature of the binary addition can not be fundamentally changed. Carry-limited or carry-free arithmetic operations using other number systems have long been investigated. While the residue number system can be used for carry-limited addition, subtraction, and multiplication directly, the so-called modified signed digit (MSD) number representation can be directly used for carry-limited addition and subtraction operations. A comparison of the two representations in terms of their similarity to the binary representations shows that the binary number representation is closer to the MSD than to the residue number system since the binary number representation is a subset of the MSD representation. The closer relationship makes it easier for a binary number to be processed in a MSD processor. The other often-mentioned advantage of the MSD over the residue representation is that the MSD uses one fixed module while the residue uses a set of different modules for computation, implying that the processing complexity of the former is evenly distributed throughout the physical system while that of the latter is asymmetrically distributed.

Based on the MSD number representation, architectures and algorithms have been proposed for fast arithmetic computations. A study of the trade-off between the processing complexity and the latency has shown that the carries generated during an addition of two MSD numbers can only propagate three steps before being compensated as illustrated in FIG. 1. In order to absorb the three steps time delay, it is also possible to design a single stage fully parallel MSD adder at the expense of using a more complicated system such as shown in FIG. 2. Three stages having a total of eleven two-variable logic gates within the dashed lines in FIG. 1 are compressed into a single stage of adders. Each of these stages of adders requires six variables to generate a single bit output. Various VLSI digital electronic as well as optical processing architectures have been proposed. Space-encoded electronic MSD gates are cascaded to form a parallel MSD adder which can then be used as a building block for other MSD arithmetic processors. Using this idea with optical processing methods has resulted in a number of optical MSD adder architectures. However, optics has not shown sufficient nonlinear processing flexibility and reliability to promote its application in the extremely competitive area of logic processing. An alternative to optical logic is the use of an optical memory look-up processor for the purpose of arithmetic processing. There, the results of the carry-limited parallel addition are recorded in either a location-addressable or a content-addressable memory (CAM). The numbers to be added are used either as the memory address directly or as special codes for access to the logically reduced associated memory in order to obtain the final addition result.

The MSD addition architecture in FIG. 2 can be used to build a CAM based MSD adder. When the electronic CAM technology is used, the generation of each bit of MSD addition result physically requires a programmable logic array (PLA) with a 1K switching capacity unless time multiplexing of the PLA is used which can save processing hardware at the cost of additional processing time.

SUMMARY OF THE INVENTION

In the present invention a free-space optical CAM is used in which the inherently parallel processing capability of optics allows a concurrent read process in a shared memory architecture.

As used herein the term "shared CAM" shall be understood to imply that one enclosed mask is shared by a parallel array of input vector data. In contrast, in an electronic content-addressable memory in order to obtain all N-bit outputs, N such CAM chips are used. The free-space optical sharing permits the use of a simple mask to filter input data patterns originating from different angles. The filtered data are automatically decoded upon arrival at the output plane (an array of output vectors).

Although specific examples of MSD processing are described below, the opto-electronic method is useful in many other parallel arithmetic and logic operations in the so-called single-instruction-multiple-data (SIMD) environment.

A principal object of the present invention is therefore, the provision of an optical modified signed-digit arithmetic processing method.

Another object of the invention is the provision of an opto-electronic shared content-addressable memory processor.

A further object of the invention is the provision of a method of decomposing MSD arithmetic operations into a matrix-matrix multiplication followed by a combination of a threshold and logic operations.

Further and still other objects of the present invention will become more clearly apparent when the following description is read in conjunction with the accompanying drawings.

DETAILED DESCRIPTION OF THE INVENTION

A MSD number is expressed as $$N_{MSD} = \sum_i a_i 2^i \tag{1}$$

where $\alpha$ can be 1, 0, or −1, and i is an index. A negative MSD number is obtained by complementing each digit of its positive MSD representation. For example, the subtraction $\mathbf{101010\bar{1}0-100\bar{1}0010}$ can be considered as $\mathbf{101010\bar{1}0+\bar{1}00100\bar{1}0}$, where $\mathbf{\bar{1}00100\bar{1}0}$ is the negative version of $\mathbf{100\bar{1}0010}$. Any MSD number has a redundant expression. For example, a decimal number 7 has four different forms in terms of the 4-bit MSD expression:

$$7_{10}=0111_{MSD}=100\bar{1}_{MSD}=10\bar{1}1_{MSD}=\bar{1}111_{MSD} \tag{2}$$

This representation redundancy can be used to encode the MSD number without consecutive 1's and −1's, simplifying the arithmetic processing complexity. As an example, the number $\mathbf{011\bar{1}1\bar{1}\bar{1}1}$ can be recoded as $\mathbf{1\bar{1}1\bar{1}010\bar{1}}$.

Figure 1:
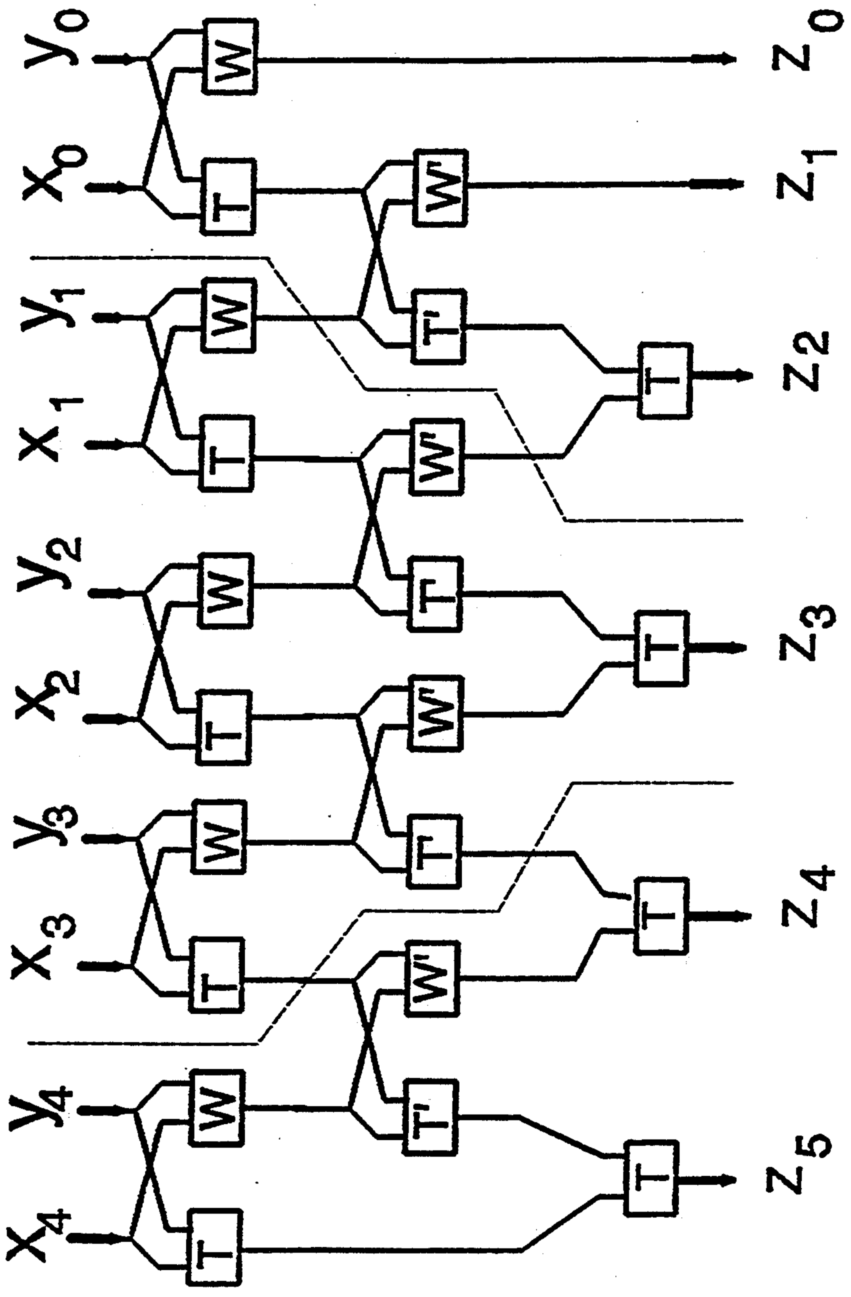
(PRIOR ART) Fig.1
FIG. 1 is a schematic diagram of a three-step 5-bit MSD adder, where the output $z_i$ is affected by six input variables: $x_i$ $y_i$ $y_{i-1}$ $x_{i-2}$ $y_{i-2}$.
Figure 2:
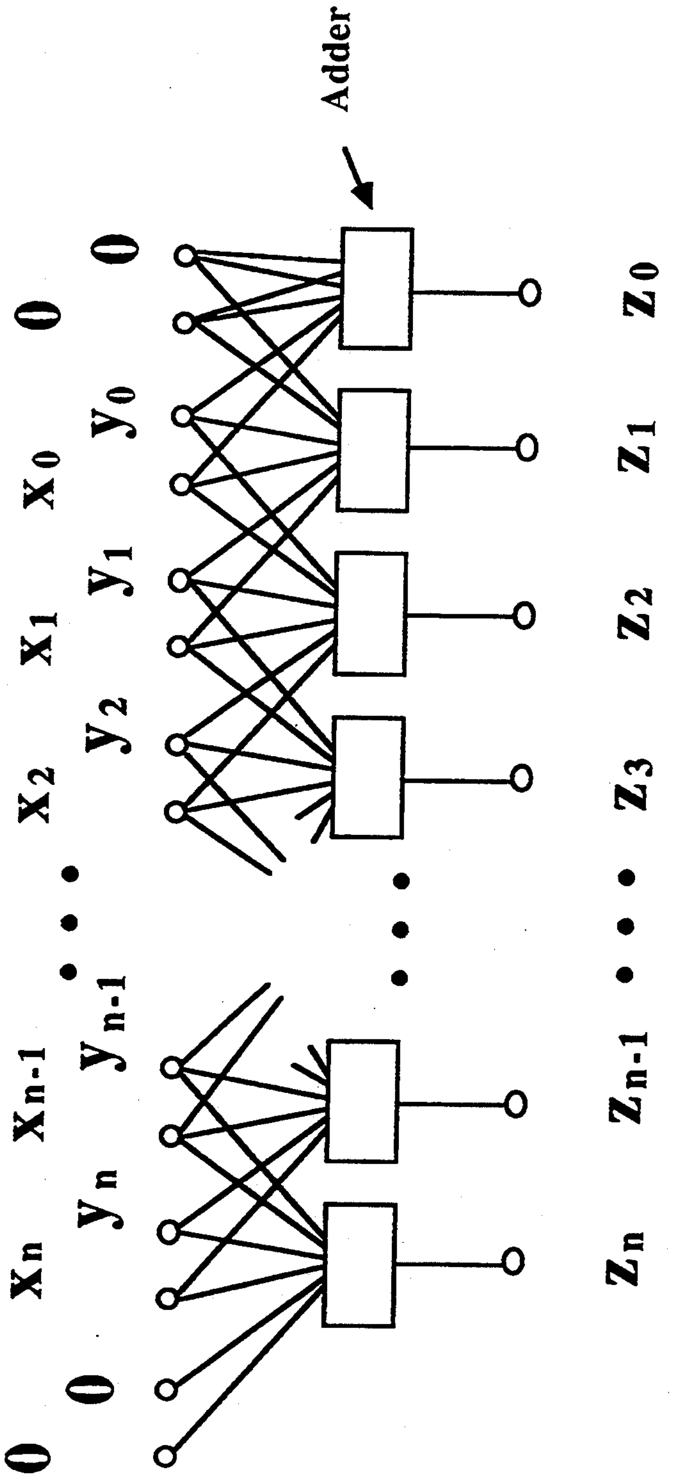
FIG. 2 is a schematic diagram of a single-step n-bit MSD adder, where a single six-variable gate replaces 11 gates in the embodiment shown in FIG. 1.

The addition of two 5-bit MSD numbers using a device incorporating the architecture of FIG. 1 is based on a three-step cascading of 1-bit MSD logic devices. To completely absorb the three-step carry propagation related delay, a single step n-bit MSD device incorporating the addition architecture of FIG. 2 is used. Instead of a pair of 1-bit MSD inputs, three pairs of MSD addends, i.e. $x_i y_i x_{i-1} y_{i-1} x_{i-2} y_{i-2}$ are used to produce the 1-bit addition result of $z_i$. Since each MSD digit has 3 possible values (1, 0, −1), the basic 1-bit addition has to handle as many as $3^6=729$ different logic combinations. Among the, there are two groups, each of 183 input patterns corresponding to the result of "1" or "−1", and a group of 363 input patterns for the result of "0". The large quantity of input patterns makes it very difficult to realize a memory look-up using a direct location addressable mode.

The logic minterm numbers for generating 1 and −1 can be further reduced, if the MSD number is coded without consecutive 1's or −1's. In addition to the memory size reduction, such a reduced CAM MSD adder unit requires only four inputs $x_i\, y_i\, x_{i-1}\, y_{i-1}$ for the look-up processing instead of six inputs. Thus, further improving the efficiency of the MSD addition.

However, the logic combinations for the 1 and −1 outputs can be reduced drastically to 28 each with the use of don't care assignments. A 1-bit MSD adder was experimentally constructed using a CAM architecture as described in the article by Y. Li et al entitled "Content-Addressable-Memory-Based Single-Staged Optical Modified Signed-Digit Arithmetic," Opt. Lett. 14 (22), 1254–1256 (1989). The article describes a method of encoding the MSD numbers and performing a vector-matrix operation for generating a 1-bit MSD result.

The present invention relies upon the same encoding method but uses a novel optical arrangement so that an array of vector-matrix multipliers can be combined into a single matrix-matrix multiplier. The output of the multiplier is subjected to a combination of a threshold and logic operations to achieve MSD arithmetic operations.

The method for using CAM for MSD addition is as follows: First, tabulate the entire truth table for the 6-bit input and 1-bit output MSD addition which has a total of 729 entries. Then, group those entries producing the addition results of 1, −1, and 0, respectively. Next, use a conventional truth-table reduction method to minimize the logic expressions for 1 and −1 with the help of partial or total don't care assignments. The reduction results for 1 and −1 are the bit wise complements to each other. Then, design logic circuits or use a programmable logic array to store the reduced logic expressions generating the results of 1 and −1. Next, compare the inputs with the stored patterns for an addition operation. A "1" (or "−1") is generated when the input matches one of the stored patterns for "1" (or for "−1"). When no match occurs, a "0" at the output is implied. Whether the reduced expressions contain 28 6-bit terms or six 4-bit terms for each of 1 and −1 depends on the input format assumption. That is, whether consecutive 1's or −1's are permitted. The addends without consecutive 1's or −1's can directly use a 6-term CAM, while the generalized binary addends will use the 28 term CAMs. In the ensuring description, the 6-term CAMs will be used to describe the opto-electronic CAM processor. The principles are equally applicable for the larger size CAM processor.

Figure 3:
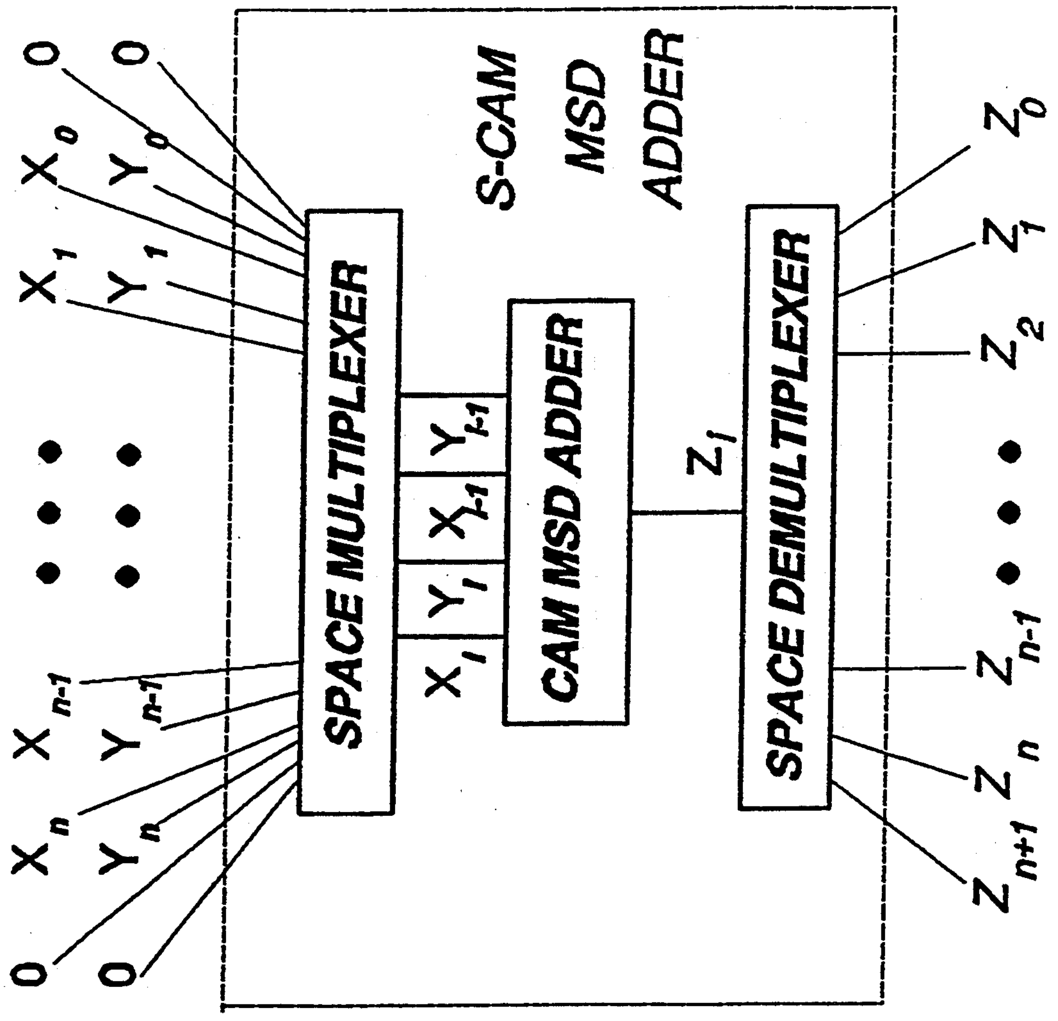
FIG. 3 is a schematic diagram of a S-CAM n-bit MSD adder, where a single four-variable CAM adder is shared by n+1 groups of four-variable input addends including a space multiplexer and a space demultiplexer.

A system schematic diagram of a direct n-but MSD adder using reduced entry terms is shown in FIG. 3. In the case of an 8-bit MSD adder, the two input MSD numbers are $X=(x_7x_6x_5x_4x_3x_2x_1x_0)$ and $Y=(y_7y_6y_5y_4y_3y_2y_1y_0)$, and the output is $Z=(z_8z_7z_6z_5z_4z_3z_2z_1z_0)$. In the case of using input addends without consecutive 1's and −1's, the output of each 1-bit adder is only affected by four rather than six input digits. The ith output digit $z_i$ is determined by the minterms $x_i$, $y_i$, $x_{i-1}$, and $y_{i-1}$. The minterms for generating 1 and −1 are $$\bar{1}\bar{1}\mathbf{11},\ \mathbf{0011},\ \mathbf{01}d\mathbf{0},\ \mathbf{01}d_{01\bar{1},10\bar{1}d}01,\ \mathbf{100}d \text{ for generating } 1 \quad (3a)$$

$$\mathbf{11}\bar{1}\bar{1},\ \mathbf{00}\mathbf{1}\bar{1},\ \mathbf{0}\bar{1}d\mathbf{0},\ \mathbf{0}\bar{1}d_{0\bar{1}}\mathbf{1},\ \mathbf{101}d_{01},\ \bar{1}\mathbf{00}d \text{ for generating } \bar{1} \quad (3b)$$

where d denotes a don't care of 1, −1 and 0, $d_{01}$ or $d_{01}$ denotes partial don't care of 0 and 1, or 0 and $\bar{1}$, respectively, The implementation of the CAM MSD additions based on these reduced logic entries involves two steps: first encoding the two addends to two MSD numbers without consecutive 1's or −1's, and then using the encoded addends $x_i$, $y_i$, $x_{i-1}$ and $y_{i-1}$ as input data to compare with the 12 stored reference logic expressions defined in Eq. 3a and 3b. When the input pattern matches any one of the 6 reference patterns for generating 1 (or −1), the output is a 1 (or −1), and otherwise the output is a zero. Subtraction is accomplished using the same method except complement coding of the subtrahend is used.

Figure 4A:
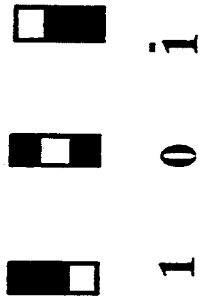
FIG. 4*a* shows an encoding rule for input data.
Figure 4B:
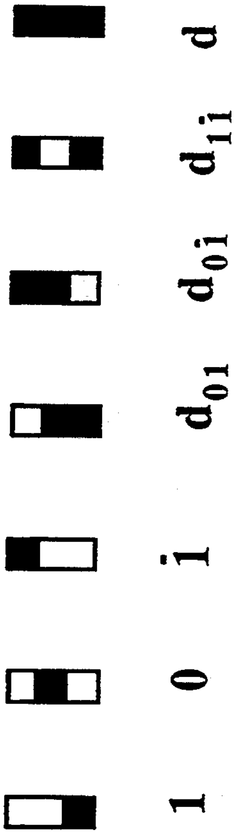
FIG. 4*b* shows the encoding rule for MSD CAM operation.
Figure 4C:
FIG. 4*c* shows an example of an encoded minterm "$d_{01}10d_{11}$"

In order to implement an opto-electronic CAM, a known method uses a non-holographic scheme together with a pulse-position coding method. To encode the MSD input for the CAM processing, three spatial channels are used to optically represent the three logic levels 1, 0, and −1. When the value of 1, 0, −1 are to be encoded, the optical signal appears at the bottom, the middle, or the top spatial channels, respectively, as shown in FIG. 4*a*. For this specific input encoding, the CAM optical memory is designed in such a manner as to provide no light transmission when a match with the input pattern occurs. FIG. 4*b* shows the CAM encoding for all seven possible cases of MSD processing. The first three patterns are for the logic values 1, 0, −1, respectively. The last four CAM mask patterns are for the storage of don't care patterns. For example, a complete don't care should always match with any input and therefore should be encoded opaque in all three pixel positions, while a partial don't care, e.g. $d_{01}$, which should match with an input value of either 0 or 1, is opaque in two of the three pixel positions. Therefore, when an encoded input pattern is illuminated onto the CAM mask, a match will result in a zero transmission while a mismatch will always result in some residue transmissions. For example, using the described encoding method, the CAM or a reduced logic expression $d_{0\bar{1}}\mathbf{10}d_{\bar{1}\bar{1}}$, which is equivalent to a sum of four minterms 0101, $\bar{1}$101, 010$\bar{1}$,$\bar{1}$, can be compressed into a string of 12 mask pixels, as shown in FIG. 4*c*. An input containing any one of the four above logic combinations should match with the mask and will generate a zero intensity signal at the output detector. For the application of MSD addition of recoded data, only 12 such reduced logical terms are needed, and the terms can be encoded into a rectangular optical mask of 12×12 pixels, as shown in FIG. 4*e*.

In order to generate each bit addition result, twelve 4-variable reduced logic terms are used, six for generation 1 and another six for generating −1. An electronic parallel implementation will result in using N+1 such duplicates for an N-bit addition since the conductive wires do not allow for space multiplexing. Time multiplexing is possible at the expense of a N+1 time step delay which will not produce any speed advantage over a regular binary serial adder. However, the use of free-space optics inherently allows for a space share architecture. More specifically, it is possible to generate the N+1 bit addition result simultaneously using a single optical CAM MSD addition mask, by a concurrent read, e.g. using a parallel matching operation. In this case, the architecture shown in FIG. 2 can be further simplified to the multiplexed hardware shown in FIG. 3, where N+1 matching operations are combined into a single device.

In accordance with the teachings of the present invention, a free-space optical S-CAM architecture for MSD arithmetic and for other synchronized parallel memory access operations will now be described.

Figure 5:
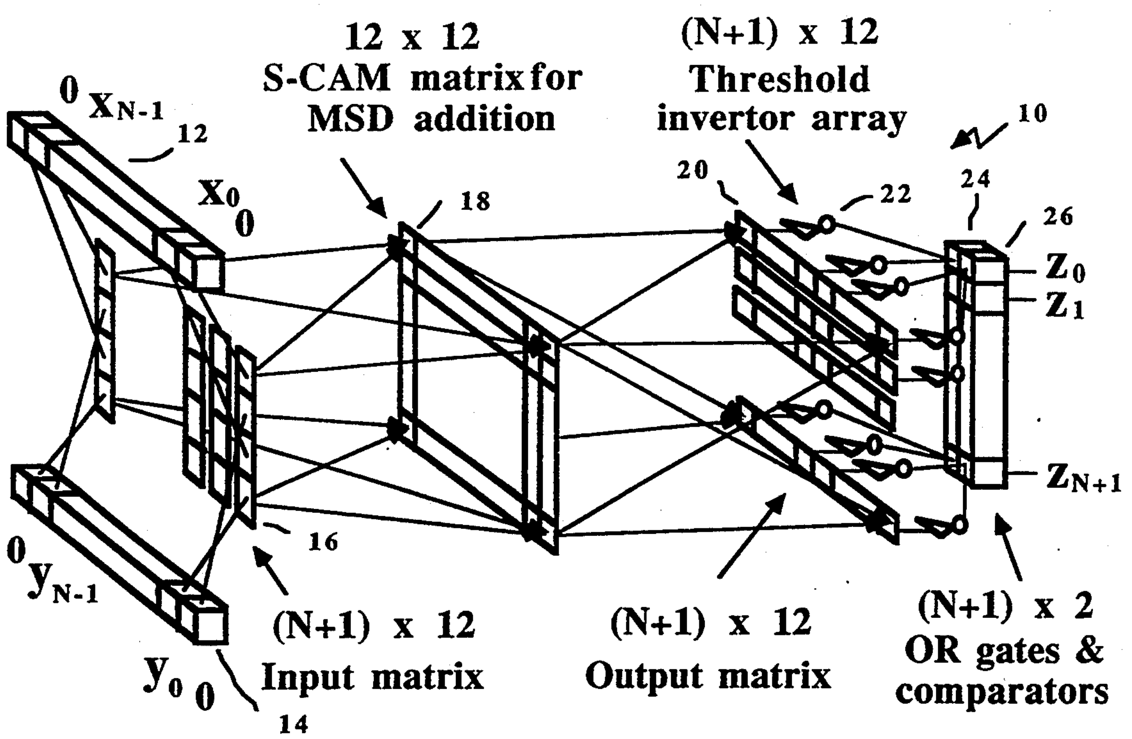
FIG. 5 is a schematic representation of an opto-electronic S-CAM MSD adder.

A schematic diagram of an opto-electronic S-CAM processor 10 for MSD addition in accordance with the present invention is shown in FIG. 5. Two parallel registers 12,14 storing N-bit addends x and y are connected to an O-E (opto-electronic) interface device input matrix A 16 with (N+1)×12 optical switching pixels. The ith column of input matrix A, comprising 12 pixels, is wired to $x_i$, $y_i$, $x_{i-1}$ and $y_{i-1}$ register cells. Depending on the input content, four of the twelve pixels in the column are turned on. Two 12×6 CAM MSD adder matrices are placed side-by-side forming a 12×12 matrix B 18. The optical multiplication of the two matrices A and B results in an output matrix C 20 of a size (N+1)×12. The 12 columns in the matrix C 20 are divided evenly into two groups for generating the final results of 1 and $\bar{1}$, respectively. To post-process the matrix optical multiplication result, an optical detector connected to each pixel in matrix C 20 is biased to a level bisecting the zero and one intensity levels. After being threshold biased, the selected signals are inverted through a (N+1)×12 logic inverter array 22. The inverted electronic signals are grouped to form inputs to the (N+1)×2 logic OR gate arrays and comparators 24, 26, where each OR gate generates a 1-bit output from its 6-bit inputs for 1 and −1 respectively. The final MSD (N+1) bit addition result is obtained by comparing the generated two channel outputs. Not shown in FIG. 5 is an array of laser diodes disposed for illuminating paths through input matrix A and matrix B.

In the described O-E architecture, free-space optics is used to perform optical matrix-matrix multiplication in parallel, while electronics circuitry is also used to perform threshold and logic inversion operations. In order to consider this memory access as a parallel matrix operation problem, a set of M CAM matching operations is allowed concurrently via the described optical matrix processor. However, a key difference between the described free-space O-E S-CAM and existing optical analog matrix multipliers is that the former does not require generation of an accurate analog output while the latter does. This implies that under the same processing accuracy constraint, the O-E S-CAM processor can be built in a much larger size than the analog matrix multiplier.

The following example described the operation of the invention. Assume two 8-bit MSD addends ($x = \mathbf{101010\bar{1}0}$) and ($y = \mathbf{100100\bar{1}0}$) are to be summed. The two 8-bit inputs are regrouped based on the input wiring topology of FIG. 3 to form a 9×4 MSD matrix of

| | | | | | | | |
|---|---|---|---|---|---|---|---|
| 0 | 0 | $x_0$ | $y_0$ | 0 | 0 | 0 | 0 |
| $x_1$ | $y_1$ | $x_0$ | $y_0$ | −1 | −1 | 0 | 0 |
| $x_2$ | $y_1$ | $x_0$ | $y_0$ | 0 | 0 | −1 | −1 |
| $x_3$ | $y_3$ | $x_2$ | $y_2$ | 1 | 0 | 0 | 0 |
| $x_4$ | $y_4$ | $x_3$ | $y_3$ | 0 | 1 | 1 | 0 |
| $x_5$ | $y_5$ | $x_4$ | $y_4$ | 1 | 0 | 0 | 1 |
| $x_6$ | $y_6$ | $x_5$ | $y_5$ | 0 | 0 | 1 | 1 |
| $x_7$ | $y_7$ | $x_6$ | $y_6$ | 1 | 1 | 0 | 0 |
| 0 | 0 | $x_7$ | $y_7$ | 0 | 0 | 1 | 1 |

Figure 4D:
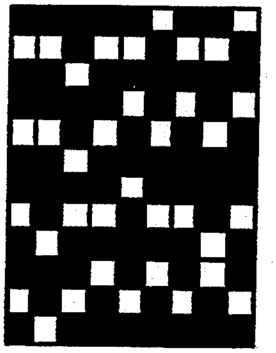
FIG. 4*d* shows the encoded input data matrix representing two input addends $\mathbf{101010\bar{1}0}$ and $\mathbf{100100\bar{1}0}$.
Figure 4E:
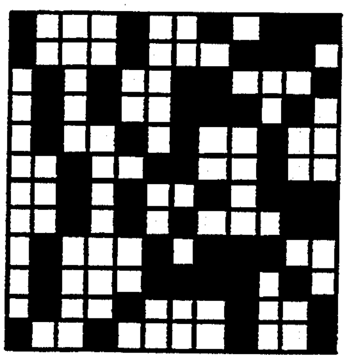
FIG. 4*e* shows an encoded CAM MSD addition mask for generating 1 and −1.

Using the encoding rules shown in FIG. 4*a*, the input matrix is then encoded to a 9×12 binary matrix A, shown in FIG. 4*d*, i.e.

| MATRIX A | | | | | | | | | | | |
|---|---|---|---|---|---|---|---|---|---|---|---|
| 0 | 1 | 0 | 0 | 1 | 0 | 0 | 1 | 0 | 0 | 1 | 0 |
| 1 | 0 | 0 | 1 | 0 | 0 | 0 | 1 | 0 | 0 | 1 | 0 |
| 0 | 1 | 0 | 0 | 1 | 0 | 1 | 0 | 0 | 1 | 0 | 0 |
| 0 | 0 | 1 | 0 | 1 | 0 | 0 | 1 | 0 | 0 | 1 | 0 |
| 0 | 1 | 0 | 0 | 0 | 1 | 0 | 0 | 1 | 0 | 1 | 0 |
| 0 | 0 | 1 | 0 | 1 | 0 | 0 | 1 | 0 | 0 | 0 | 1 |
| 0 | 1 | 0 | 0 | 1 | 0 | 0 | 0 | 1 | 0 | 1 | 0 |
| 0 | 0 | 1 | 1 | 0 | 0 | 0 | 1 | 0 | 0 | 1 | 0 |
| 0 | 1 | 0 | 0 | 1 | 0 | 0 | 0 | 1 | 0 | 0 | 1 |

Based on Eq. 3, together with the CAM MSD addition matrix encoding rules shown in FIG. 4*b*, a 12×12 pixel array is formed e.g. as shown in FIG. 4*e*,

| MATRIX B | | | | | | | | | | | |
|---|---|---|---|---|---|---|---|---|---|---|---|
| Generating 1 | | | | | | Generating −1 | | | | | |
| 0 | 1 | 1 | 1 | 1 | 1 | 1 | 1 | 1 | 1 | 0 | 0 |
| 1 | 0 | 0 | 0 | 1 | 1 | 1 | 0 | 0 | 0 | 1 | 1 |
| 1 | 1 | 1 | 1 | 0 | 0 | 0 | 1 | 1 | 1 | 1 | 1 |
| 0 | 1 | 1 | 1 | 1 | 1 | 1 | 1 | 0 | 0 | 1 | 1 |
| 1 | 0 | 1 | 1 | 0 | 0 | 1 | 0 | 1 | 1 | 0 | 0 |
| 1 | 1 | 0 | 0 | 1 | 1 | 0 | 1 | 1 | 1 | 1 | 1 |
| 1 | 1 | 0 | 1 | 0 | 1 | 0 | 0 | 0 | 0 | 1 | 1 |
| 1 | 1 | 0 | 0 | 1 | 0 | 1 | 1 | 0 | 0 | 1 | 0 |
| 0 | 0 | 0 | 0 | 1 | 1 | 1 | 1 | 0 | 1 | 0 | 1 |
| 1 | 1 | 1 | 0 | 1 | 0 | 0 | 0 | 1 | 1 | 0 | 0 |
| 1 | 1 | 0 | 1 | 0 | 0 | 1 | 1 | 0 | 1 | 0 | 0 |
| 0 | 0 | 1 | 1 | 0 | 0 | 1 | 1 | 1 | 0 | 1 | 0 |

The addition is performed by multiplying 12 pixels in each row in input matrix A with 12 pixels in each column of the MSD CAM matrix B, which is actually a matrix multiplication of matrices A and B. This multiplication generates an analog output matrix C of the size 9×12, whose intensity entries read as

| MATRIX C | | | | | | | | | | | | |
|---|---|---|---|---|---|---|---|---|---|---|---|---|
| Generating 1 | | | | | | Generating −1 | | | | | | Final result |
| 4 | 4 | 2 | 1 | 2 | 1 | 4 | 2 | 1 | 3 | 1 | 2 | 0 |
| 2 | 4 | 1 | 3 | 3 | 2 | 4 | 4 | 1 | 2 | 2 | 1 | 0 |
| 4 | 2 | 2 | 2 | 2 | 2 | 2 | 0 | 2 | 2 | 2 | 2 | −1 |
| 3 | 3 | 2 | 3 | 1 | 0 | 3 | 3 | 2 | 3 | 2 | 1 | 1 |
| 3 | 2 | 0 | 1 | 3 | 3 | 3 | 3 | 2 | 3 | 2 | 1 | 1 |
| 3 | 2 | 3 | 3 | 1 | 0 | 3 | 3 | 1 | 3 | 2 | 3 | 1 |
| 3 | 1 | 1 | 2 | 2 | 2 | 4 | 2 | 1 | 3 | 1 | 2 | 0 |
| 4 | 4 | 1 | 2 | 2 | 1 | 2 | 4 | 2 | 3 | 3 | 2 | 0 |
| 2 | 0 | 2 | 2 | 2 | 2 | 4 | 2 | 2 | 2 | 2 | 2 | 1 |

Whenever a row from the matrix A representing the input data matches with a column of the MSD CAM matrix B, the two inversely coded patterns overlap and yield a "0" output, and the final addition result of the corresponding digit is "1" (or "−1"). If no match occurs, the final result of the digit is a "0". The column at the far right is the final MSD addition result generated after the threshold and inversion operations are performed by electronic post-processing.

In order to implement the O-E S-CAM architecture, a system performing an optical matrix-matrix multiplication is essential. However, the global communication nature of matrix multiplication causes difficulty in its implementation using space invariant optical components. Existing optical matrix-matrix multiplication methods are based on the use of an array of space- variant holograms or lens arrays. Vector-vector outer product processors are also used in a sequential fashion for a matrix-matrix multiplication. A non-linear four-wave mixing and signal degeneracy based optical matrix-matrix multiplier has also been used.

Figure 6A:
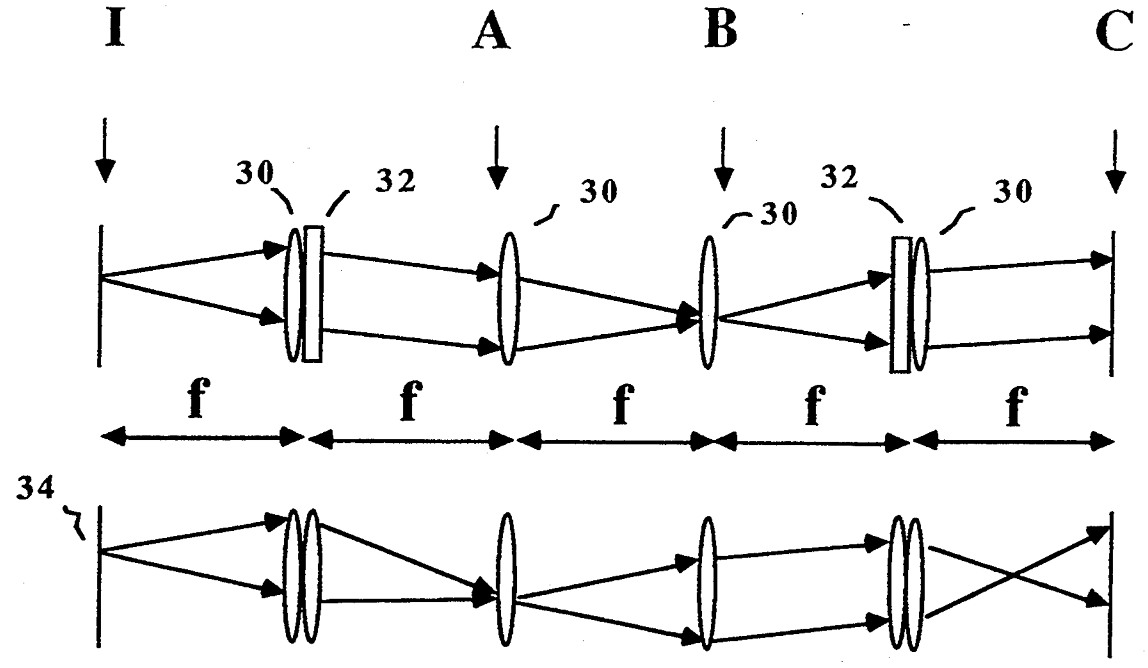
FIG. 6*a* is a schematic representation of a 5-f triple matrix multiplier.

The present invention maintains the advantage of the high processing speed and the high space-bandwidth product that an optical space-invariant processor provides while achieving the goal of performing matrix multiplication using optics. Based on this principle, a novel approach for the optical matrix-matrix multiplication is achieved by employing an optical triple matrix product processor with one of the three multiplying matrices being used as an identity matrix, containing only unit values along its main diagonal entries. In FIG. 6*a*, a space-invariant optical triple matrix product processor is depicted. Four spherical lenses 30 and two cylindrical lenses 32, each with an identical focal length f, are used. Four important planes denoted by I, A, B, and C are used to locate the optical identity source matrix, the MSD input addend matrix, the coded CAM matrix, and the output produce C=IAB=AB matrix, respectively. Shown below the lens arrangement in FIG. 6*a* is the ray path from a point source 34 at plane I through the 5f system to the output product C matrix illustrating matrix multiplication.

Figure 6B:
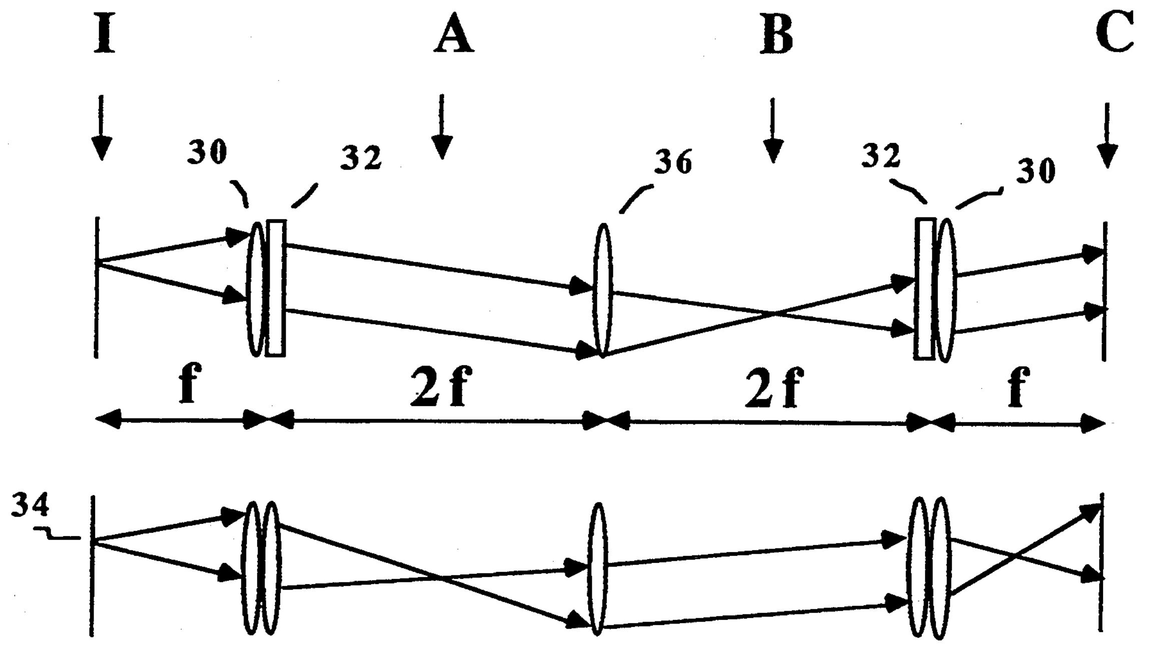
FIG. 6*b* is a schematic representation of a 6-f triple matrix multiplier.
Figure 7:
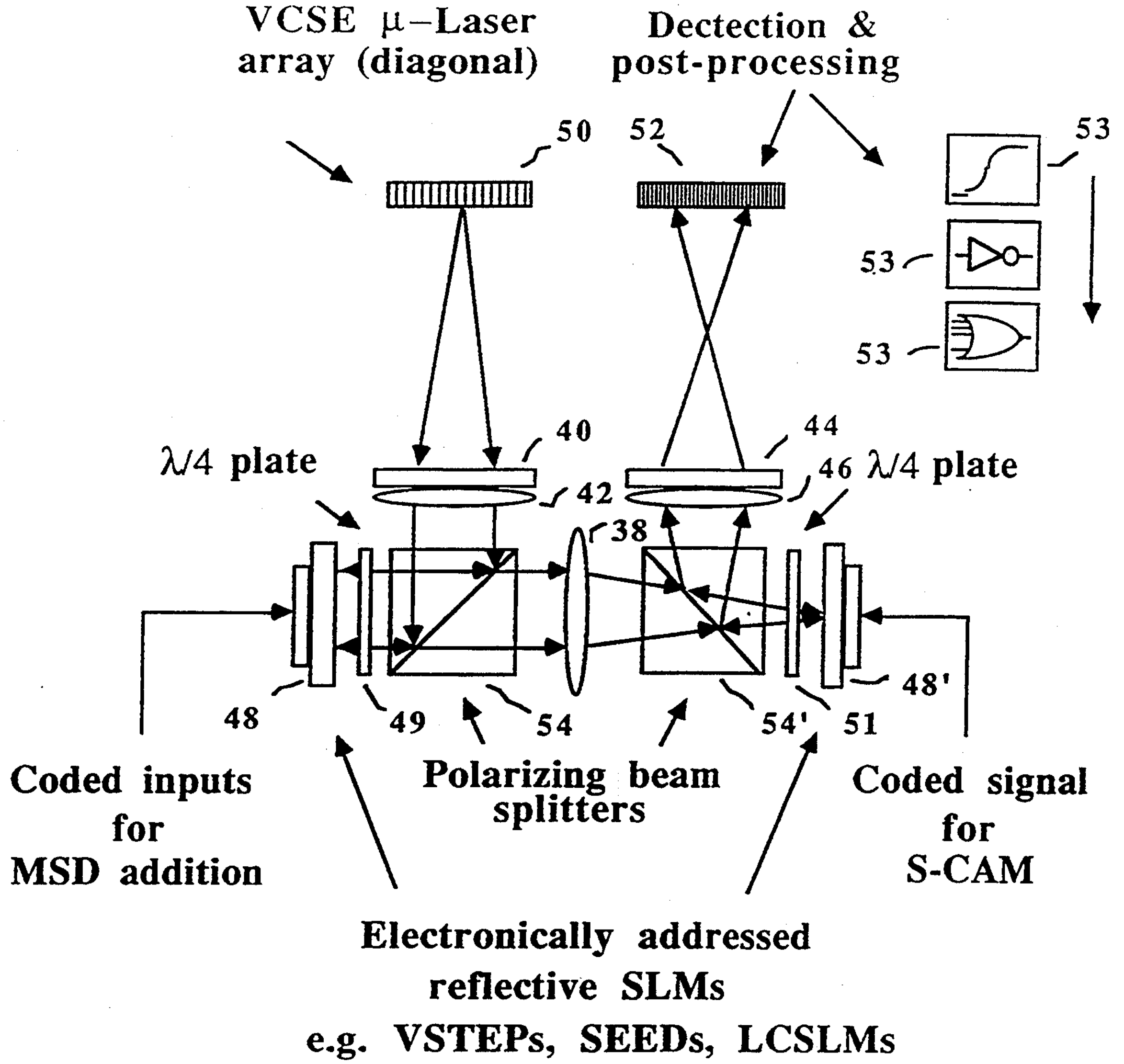
FIG. 7 is a schematic representation of a CAM MSD adder architecture based on electrically addressed reflective SLMs.

A limitation of this system is that the matrices A and B are disposed adjacent or attached to the lenses 30 in proximity to planes A and B, respectively. Such a direct attachment makes it difficult for use with a practical optical switch array, especially an array with a reflective spatial light modulator (SLM), such as a VSTEP, a SEED, or a liquid crystal light valve (LCLV). In order to overcome this limitation, a system modification replacing the two attached (matrix with lens) optical planes with two detached planes is used. The two middle spherical lenses 30 are used to transform collimated beams to focused beams and vice versa between the two planes where matrices A and B are located. Thus, a simple method of replacing the two middle spherical lenses is to use a single spherical lens 36 disposed one focal length behind the first matrix plane A and one focal length in front of the second matrix plane B, as shown in FIG. 6*b*. The same arrangement may be used to perform parallel analog optical calculations of multiple output-products. Except for using a longer system dimension of 6f, instead of the system dimension 5f as used in FIG. 6*a*, the modified system performs identical computations. However, since the planes A and B for inserting the two multiplying matrices are located apart from the lenses, reflective optical switching devices can be used in the system. In FIG. 7, a system embodiment using reflective spatial light modulators (SLMs) is shown. The optical distances from the lenses 38, 40, 42, 44, and 46 to the SLMs 48, and to the input laser array 50 or the output detector array 52 are maintained at one focal length. Polarizing beamsplitters 54 and 54' are used to guide beams into and out of the electronically addressed SLMs 48 and 48' respectively. A first quarter-wave plate 49 is disposed in the path between polarizing beam splitter 54 and spatial light modulator 48, and a second quarter-wave plate 51 is disposed in the path between second polarizing beam splitter 54' and second spatial light modulator 48'. Detector and electronic post processing is shown symbolically as array 52 and logic boxes 53. The precise gates and circuitry used is application dependent and is shown here only symbolically. Although in the present MSD processing application the CAM is encoded into a simple read only mask, the use of a second SLM permits a more flexible and more powerful dynamically shared CAM (DS-CAM) processing by reconfiguring the CAM matrix. Such an O-E DS-CAM is important in SIMD array processing.

The processing capability measured by the number of bits a system can process per unit time may be limited by the system cross-talk rate (CTR) and power efficiency. MSD computing using three logic levels is performed using a matrix multiplication involving binary input entries only. The computation comprises a two variable multiplication operation followed by a M-variable summation operation, where M=18 for the generalized input and M=12 for inputs without consecutive 1's and −1', i.e.

$$C_{ij} = \sum_{k=0}^{M-1} a_{ik} b_{kj} \qquad (4)$$

In accordance with the present inventions, the multiplication of two variables is implemented by passing the light beams through the two intensity coded masks, while the summation is obtained by superimposing optical signals from different mask cells to a specific point on the output plane. Although the electronic logic post-processing is also important, the invention is primarily concerned with the noise caused by the optical processors and assumes that the electronic components meet the accuracy requirement.

Figure 8:
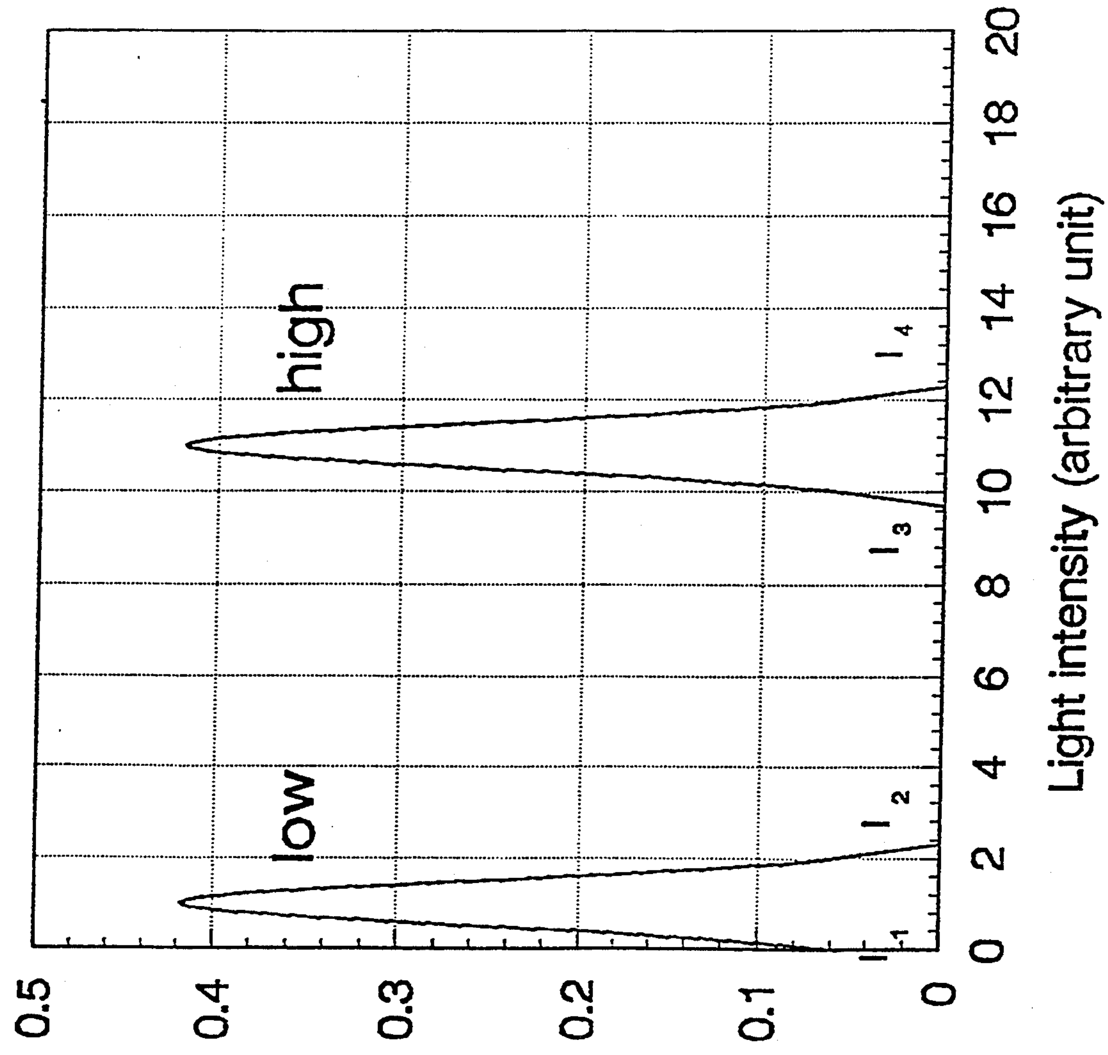
FIG. 8 is a graphical representation of a typical Gaussian probability density functions of low and high level input signals.

The following analysis assumes that both the low and high logic levels are two random variables distributed around their respective mean values $I_l$ and $I_h$. The ratio of the means values $R=I_h/I_l$, and their standard deviations $\sigma_l$ and $\sigma_h$, are the parameters used to describe the two random variables. The larger than R value and the smaller the $\sigma$ value, the higher is the processing accuracy. As an example, the density functions associated with two logic values with a common deviation of 0.5, and with means of 1 and 11, respectively, are depicted in the graph in FIG. 8.

Figure 9:
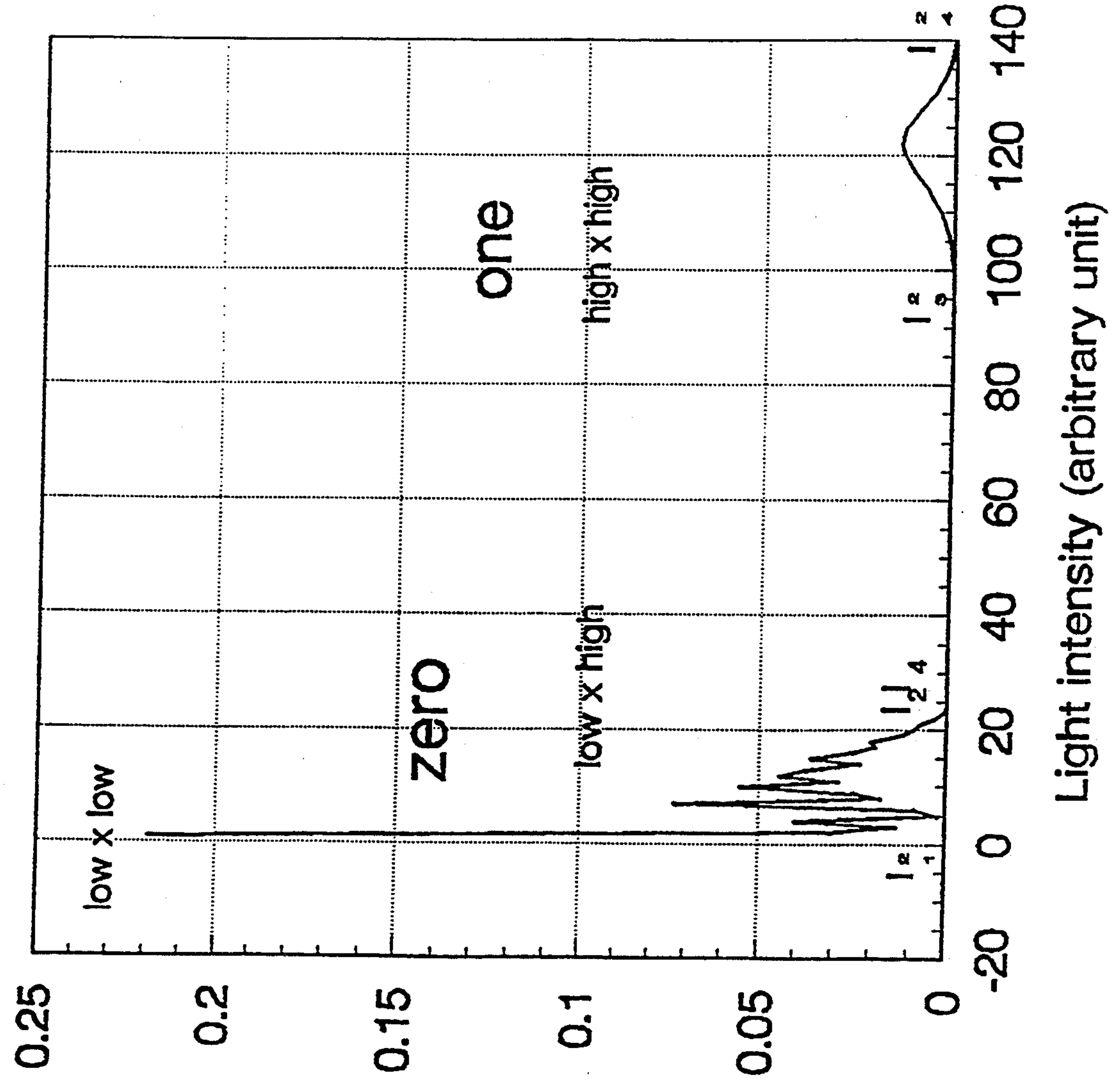
FIG. 9 is a graphical representation of a probability density function of the multiplication result of the two inputs shown in FIG. 9.

Since a LD (laser diode) is an incoherent light source and the two matrix switch arrays are independent, the random variables assigned to these arrays can be considered independent of each other. The multiplication of the two matrix elements is a product of the two variables A and B, and the probability density functions of the product variable C=AB can be evaluated using $$f_C(c) = \int_{-\infty}^{\infty} \frac{1}{|w|} f_A(w) f_B\left(\frac{C}{w}\right) dw, \qquad (5)$$

where $f_A(x)$ and $f_B(y)$ are the probability density functions of the two input variables A and B. The multiplication yields three possible results: a product of two low levels, a product of one high and one low levels, and a product of two high levels. The first two products generate a "zero" value result, while the third one results in a "one". Since the two operands are independent, the means value of the product is the product of the two corresponding mean values. In FIG. 9, there is a graph showing the density function of the new random variable as the result of the product of the two variables shown in FIG. 8. When the low and the high levels are ranged from $I_1$ to $I_2$, and from $I_3$ to $I_4$, respectively, the range of the "zero" product is distributed approximately from to $I_1^2$ to $I_2I_4$, while the range of the "one" level is distributed from approximately $I_3^2$ to $I_4^2$.

Figure 10A:
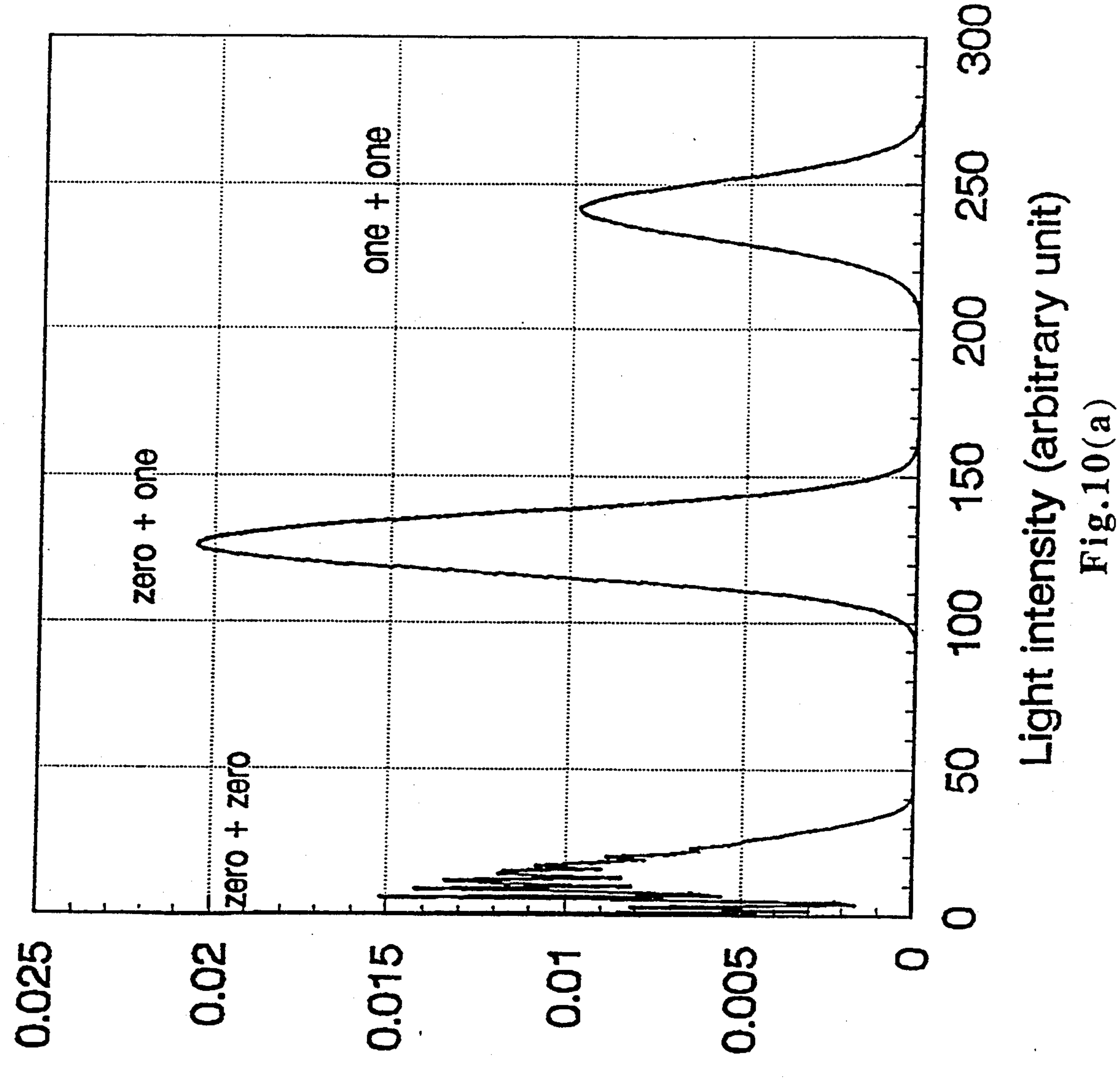
FIG. 10*a* is a graphical representation of a probability density function of the summed variable of four variables defined in FIG. 9.
Figure 10B:
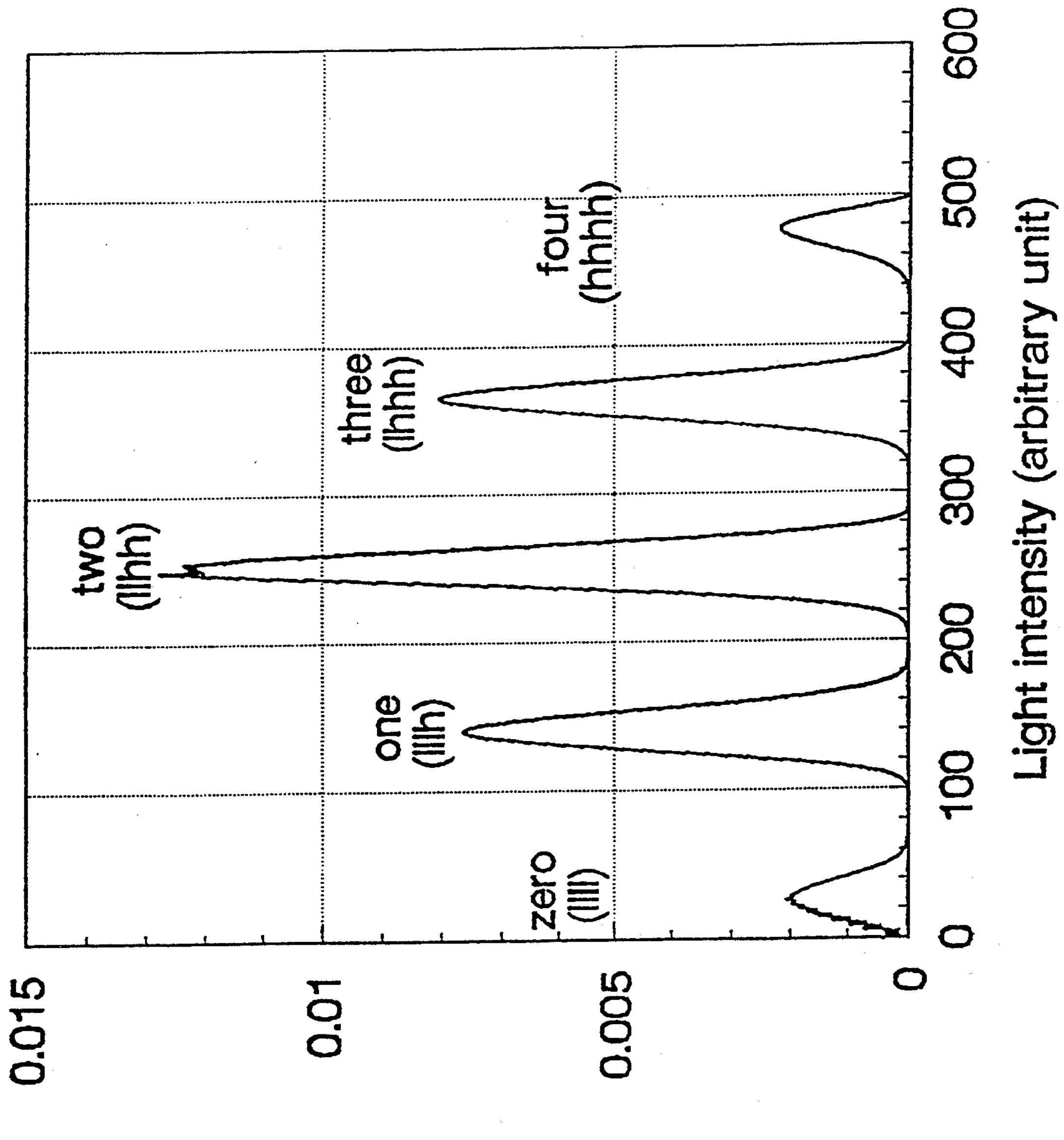
FIG. 10*b* is a graphical representation of a probability density function of the summed variable of four variables defined in FIG. 9.

After the two variables are multiplied together, the M independent products are added at the S-CAM's output plane. In the proposed 8-bit MSD addition case, M is 12 or 18, depending on whether the 6-variable or the 4-variable minterm is used. The summation generates a new random variable whose probability density function is the convolution of M input density functions:

$$f_o(O) = f_{C1}(C_1) * f_{C2}(C_2) * f_{C3} * \ldots * f_{CM}(C_M) \qquad (6)$$

where $C_1, C_2, \ldots C_M$ are the product variables formed in the previous stage, being either "zero" or "one". The results of the summation dependents on how many "zero"s and "one"s are involved. A ZERO intensity result is generated when all the elements being added are "zero"s, while an analog ONE intensity is obtained when a single "one" is added with all other "zero"s. According to the triple rail encoding rules for the input data (see FIG. 4*d*), only one third of the M pixels are turned on at a given time, therefore, the maximum intensity level of the M variable summation is M/3, when all the M/3 bright pixels are overlapped by the bright pixels in the matrix B. In the MSD adder example, the outer product of a dimension M=12 is used, therefore the final result ranges from intensity ZERO to FOUR. For example, the intensity function of a summation of two variables shown in FIG. 9 is illustrated in FIG. 10*a*, while that of a summation of 12 such variables resulting in five output levels ZERO to FOUR is shown in FIG. 10*b*.

Since the encoded data and the CAM matrices are complement to each other, a "match" should result in generating a total dark optical signal. This negative logic coding rule is preferable to a positive coding rule, with which a "match" results in a "brightest" output, because detection of a "darkest" pixel is usually easer than detection of a "brightest" pixel. However, it will be apparent to those skilled in the art that the invention is operative using a positive coding rule. In order to detect a ZERO output, it is only necessary to distinguish the final ZERO intensity from the other the possible intensity levels. A computation error occurs only when the distribution of the final ZERO is mistakingly identified as that of the final ONE, or vice versa. In order to achieve a maximum computing accuracy, the intensity threshold level at the output detectors should be set to a point at which the density functions of the output variable satisfy the condition $$f_{ZERO}(I_{th})=f_{ONE}(I_{th}). \quad (7)$$

The CTR (cross-talk rate) can be used to evaluate the digital computation accuracy, which in this case can be defined as $$CTR = \frac{\int_0^{th} f_{one}(I)dI + \int_{th}^{\infty} f_{zero}(I)dI}{\int_0^{\infty} f_{zero}(I)dI}. \quad (8)$$

Figure 11:
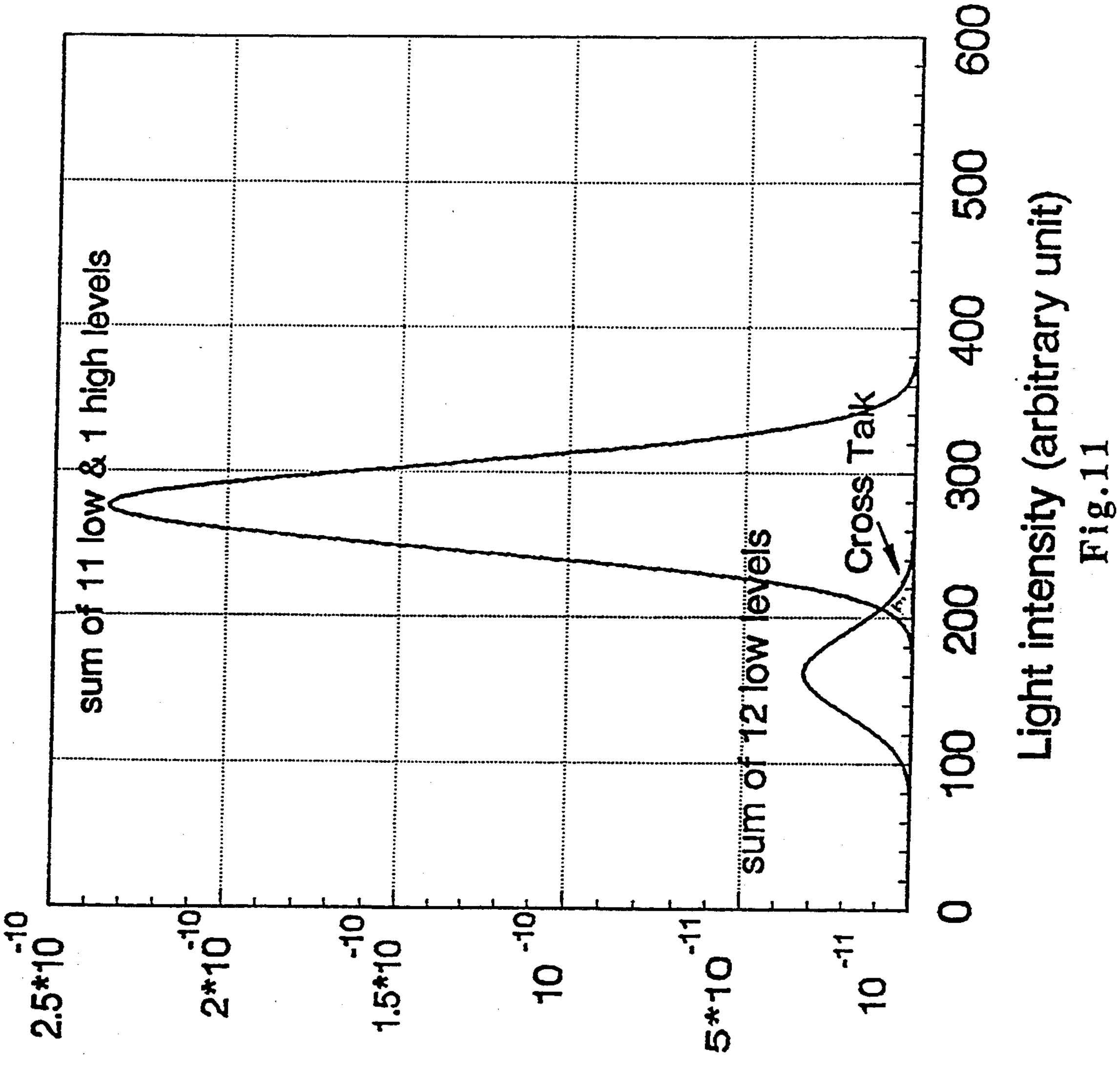
FIG. 11 is a graphical representation of a probability density function of the summed variable of 12 variables defined in FIG. 9.

For example, the use of the Gaussian distributed random signals with a mean value ratio $R=11, \sigma=0.5$, and $M=12$ results in an error distribution curve as shown in FIG. 11. The CTR is calculated as the ratio of the overlapped area of curves $f_{ZERO}(I)$ and $f_{ONE}(I)$ to the entire area under the curve $f_{ZERO}$.

After the selection of a probability density function for the input variables, the CTR basically depends on the mean value ratio R and the standard deviation $\sigma$ of the input variables. For an ideal system, R would be $1{:}0=\infty$, and $\sigma$ would be 0. However, the values of R and $\sigma$ of the proposed S-CAM MSD adder, in a practical system, are determined by the system spatial noise characteristics such as the gain variations between laser diodes, the response variations among detectors, the system alignment errors, the variations in cell contrasts, and the cell-caused diffractions.

Estimate the R and $\sigma$ in terms of the system diffraction effect and denote them as $R_d$ and $\sigma_d$. Either $R_d$ or $\sigma_d$ of the low and high levels can be linked to the system diffraction. On the mask planes, the light beam is focused or broadcast along the two orthogonal dimensions. Assuming that the Fraunhofer approximation is used, the diffraction pattern of a rectangular cell array, representing either the input data or the CAM matrix, is a set of displaced sinc functions. The normalized maximum intensity of the ith diffraction order is $$y_i = \left(\frac{\sin x_i}{x_i}\right)^2 \quad (9)$$

where $x_i$ ($i=1, 2, \ldots, M-1$) is measured from the center of the diffraction pattern to the ith maximum intensity location. A list of $x_i$ and the corresponding normalized intensity $y_i$ are tabulated in Table I.

TABLE I

Diffractions from rectangular cells

| i | $x_i$ | $y_i = (\sin x_i/x_i)^2$ |
|---|---|---|
| 0 | 0 | 1 |
| 1 | 4.493 | 0.04718 |
| 2 | 7.725 | 0.01694 |
| 3 | 10.90 | 0.00834 |
| 4 | 14.07 | 0.00503 |
| 5 | 17.21 | 0.00371 |
| | ... | ... |
| 11 | 36.13 | 0.0007 |

where:

i: diffraction order, $x_i$: distance from the origin of the main lobe, $y_i$: normalized light intensity of the ith diffraction side lobe Since the width of the main lobe of the zero order diffraction is twice as wide as its side lobes, in order to avoid the adjacent cell's main lobes spilling over to other cells, the space between the consecutive cells must be at least as large as the size of the main lobe, i.e.

$$s \geq 2w \quad (10)$$

where s is the spacing between the two adjacent cells, and w is the half-width of the main lobe of the diffraction pattern. In case of $s=2w$ for a particular cell, all its higher order side lobes will be within its neighbor cells, and affect its ith neighbor's intensity by a value of about $(y_{2i}+y_{2i-1})$. The actual intensity of the low level signal is the summation of the diffraction affected by all of its neighbors. Since an individual LD is an incoherent source, the intensity deviation from the main lobe intensity caused by high order diffraction of its neighbor cell can be calculated by accumulating $y_i$s. The most diffraction noise occurs when the two nearest cells of a dark cell are both bright. Then the first and second side lobes of the two neighboring cells diffraction fall into the dark cell. The accumulated normalized intensity $\Delta_1$ of the dark cell becomes $$\Delta_1=2(y_1+y_2)=0.128 \quad (11a)$$

Using the triple-rule encoding rule, the smallest diffraction noise occurs when there are four dark cells sandwiched between two bright cells. In this case, the normalized intensity $\Delta_4$ of the center dark cell can be calculated approximately as $$\Delta_4 = \sum_{i=3}^{6} y_i = 0.019 \quad (11b)$$

When there are two or three dark cells between two bright ones, the normalized intensities $\Delta_2$ and $\Delta_3$ of the sandwiched dark cells are between $\Delta_1$ and $\Delta_4$ $$\Delta_2 = \sum_{i=1}^{4} y_i = 0.077 \quad (11c)$$

$$\Delta_3 = 2(y_3 + y_4) = 0.026 \quad (11d)$$

Assuming that each of these four cases appears with the an identical probability of $P_\zeta=\frac{1}{4}$. Then, the mean value of a resulting random variable $I_\zeta$ is $$\mu = \frac{1}{4} \sum_{\zeta=1}^{4} \Delta_\zeta = 0.063 \quad (12)$$

Eq. 12 only generates an approximate estimation, since higher orders diffraction of far away neighbors also have some minor contributions to the dark cell's intensity. Thus, the means value $\mu$ should be increased slightly to $\mu = 0.08$. Considering that the main lobe is twice as wide as the higher order side lobes, its normalized intensity should be 2. Since the bright cell is also affected by the neighboring cell's diffraction, let the mean value of the high levels be $2+\mu$, and the ratio $R_d$ be $(2+\mu)$: $\mu$. $=26$.

The other important parameter, the standard deviation $\sigma_d$, is also affected by the diffraction of the two sets of neighbors of a particular cell. Basically, the distribution characteristics of both the low and the high levels are caused by the same diffraction, and their $\sigma_d$'s can be considered identical. For the low level $I_1$ shown in Eq. 12, the deviation can be evaluated as $$\sigma_d^2 = \Sigma(\Delta_\zeta)^2 P(I_\zeta) = 0.076^2 \quad (13)$$

Considering the diffraction of the further neighbor's diffraction the deviation can be chosen as $\sigma_d = 0.08$, which is approximately twice that of the low level's mean value.

When the mask-cell aperture is increased to include lower order diffraction side lobes, the noise caused by the diffraction of the neighboring cells is decreased rapidly. For example, when s=4 w, the aperture-cell covers both the main lobe and two closest side lobes of the diffraction pattern. The corresponding values for the ratio $R_d$ as a function of the mask-cell aperture increase are shown in the second column of Table II.

TABLE II

| | Parameters Used for CTR Simulators | | |
|---|---|---|---|
| a | $R_d$/R | $\sigma_d/\sigma$ | CTR (M = 12) |
| 2w | 26/19 | 0.08/0.12 | 0.01 |
| 3w | 46/31 | 0.03/0.045 | $10^{-5}$ |
| 4w | 69/46 | 0.02/0.03 | $10^{-16}$ |
| 5w | 92/61 | 0.015/0.022 | $10^{-22}$ |

where:

w: half-width of the main diffraction lobe, a: mask cell's aperture width,

R: ratio of the high and the low light intensities, $R_d$: intensity ratio caused by the mask diffraction, $\sigma$: deviation of the intensity distribution of the low and high levels, $\sigma_d$: deviation caused by mask diffractions, CTR: the cross talk rate for the matrix dimension M=12.

In addition to the diffraction caused error, other device-related noises should also be taken into account. The R and $\sigma$ for the entire system can be evaluated by modifying the diffraction caused $R_d$ and $\sigma_d$, using a multiplicative parameter. In a computer simulation mode, the ratio R was assumed to be 75% of $R_d$, while the $\sigma$ for the entire system is chosen as 1.5 times of $\sigma_d$. In Table II, for M=12, the relations between R and $R_d$, $\sigma$ and $\sigma_d$ for different mask sizes are listed.

The CTR, as a measure of array computation accuracy, is defined here as the normalized cross talk between the results of intensity levels ZERO and ONE in the O-E S-CAM adder application. The CTR decreases rapidly when the mean value ratio R increases or the deviation $\sigma$ decreases, or both. When the mask-cell aperture is enlarged from two to six times that of the half-width of the diffraction main lobe, the corresponding CTR can be decreased from 0.1 to $10^{-22}$, as shown in the graph in FIG. 12. For a high-speed computing system, the CTR, which can affect the over-all bit-error rate, must be significantly lower than that found in a communication system. For instance, a fiber-optic transmission system usually tolerates a BER of $10^{-9}$ at the gigahertz-transmission rates, while for a digital system, the BER at these frequencies is restricted to $10^{-15} \sim 10^{-17}$. In order to achieve a certain computation accuracy, the mask-cell aperture must be large enough to minimize the diffraction caused errors.

The restriction of processing capacity due to allowable CTR and power efficiency must be considered fundamental to an optical parallel processing system design. The half-width of the main lobe of the diffraction pattern is $$w = \frac{f\lambda}{a} \quad (14)$$

where $\lambda$ is the LD wavelength, $\alpha$ is the cell aperture, and f is the lens focal length. In order to limit the diffraction caused noise, the space s should be larger than the main lobe width. When the cell's aperture only corresponds to the diffraction main lobe, i.e. s=2 w, and assuming that the mask nearest-neighbor cell spacing s is 1.1 times larger than the cell aperture $\alpha$, the mask aperture size can be expressed as a function of the $\lambda$ and f:

$$\alpha > \sqrt{1.8\,\lambda f} \quad (15)$$

Figure 12:
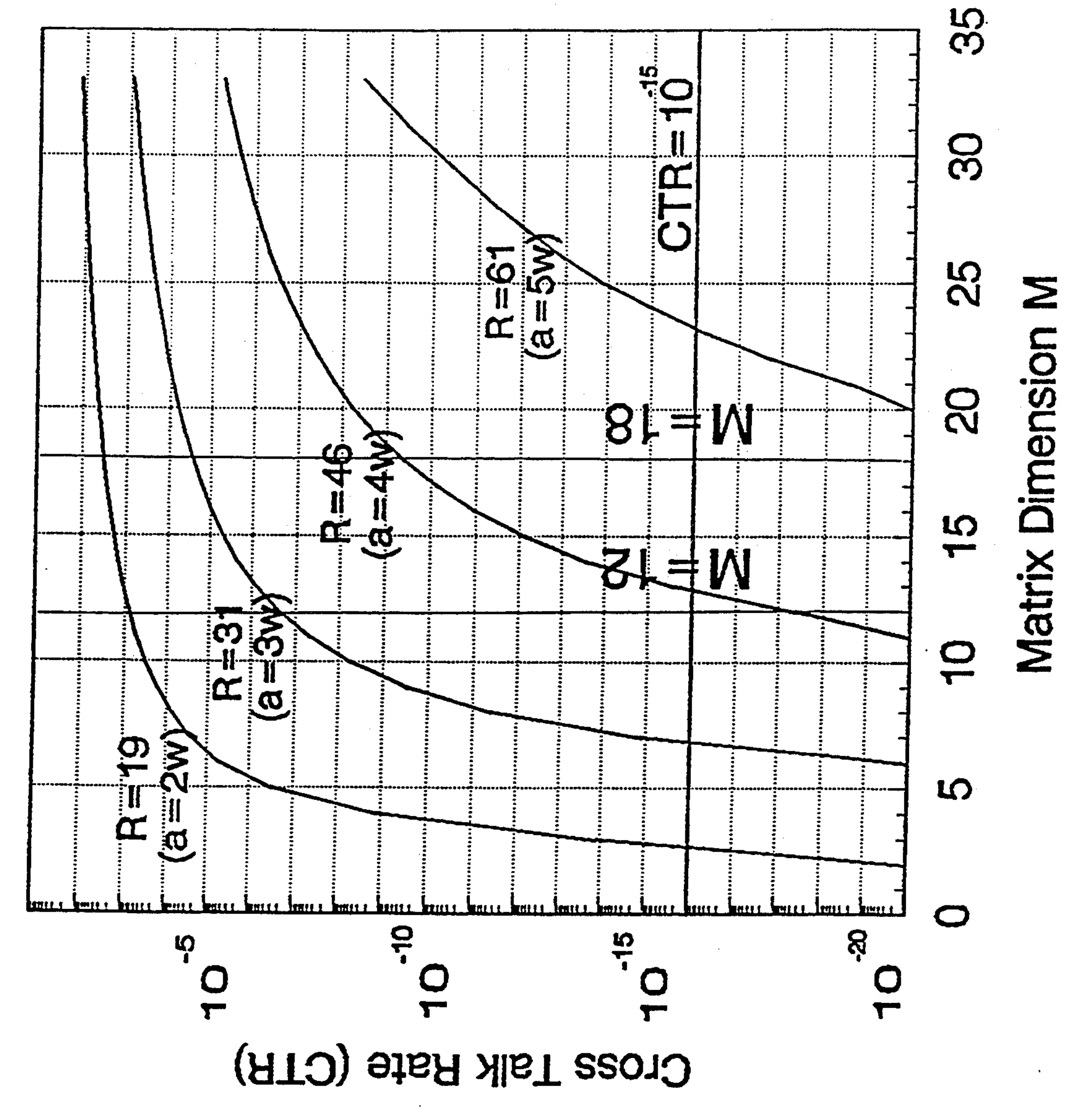
FIG. 12 is a graphical representation of a cross-talk rate (CTR) resulting from the use of a matrix dimension M, where $\alpha$ is mask-cell aperture, w is the half-width of the diffraction main lobe, and R is the related intensity ratio of the low and high levels.

However, when the CTR is less than $10^{-15}$, and the above aperture size is used, the matrix dimension M is limited to two (see FIG. 12). In order to satisfy a condition which allows for both a reasonably large M and CTR, some optical processing parameters, such as the mask cell aperture, the LD wavelength, and the lens focal length must satisfy a certain relation. Based on the data in FIG. 12, for CTR$=10^{-15}$ and M=12, R should be larger than 50, resulting in s should be set to be four times larger than w, and hence the aperture must be $$\alpha > \sqrt{3.6\lambda f} \quad (16)$$

Figure 13:
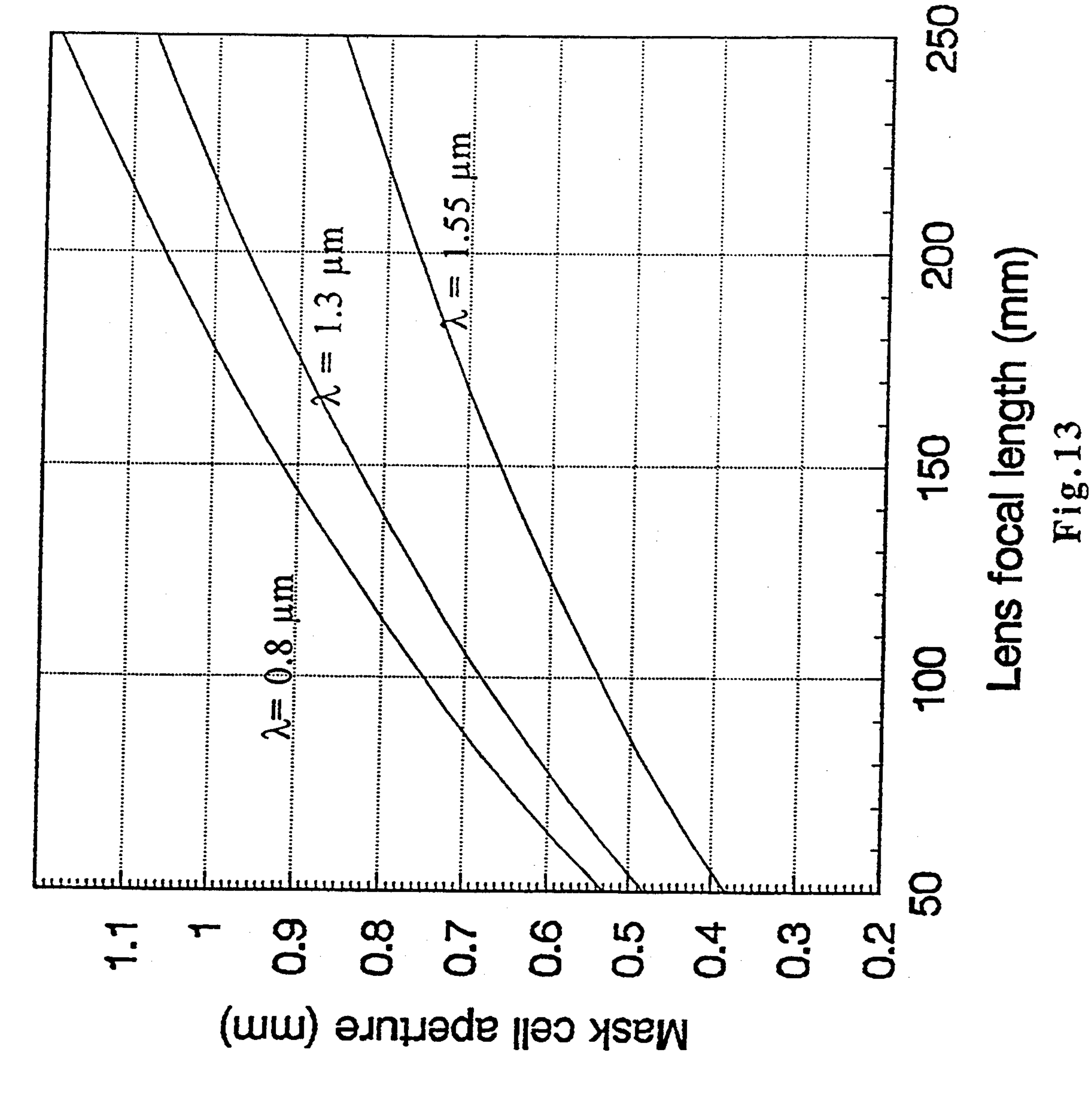
FIG. 13 is a graphical representation of selections of the diffraction-limited mask cell apertures, with $\lambda$ as the reference wavelength.

In this case, the mask-cell size should be ranged from 0.4 to 1.1 mm for the lens focal length in a range from approximately 50 mm to 250 mm, and for the different LD wavelengths shown in FIG. 13.

The processing capacity of the proposed S-CAM MSD adder is also limited by the power utilization efficiency of the system. A system parameter known as the element-bit-rate (EBR) is used to measure the number of bits which can be processed per second per element. The EBR is determined by the input source power level, the system power efficiency, the detector sensitivity, and the number of bits the processor is capable to handle.

To ensure that the output signals are detected correctly, assume that the bit power received by the detector must be larger than the detector's sensitivity of 10,000 photons per bit. In order to satisfy this requirement, the power delivered to a single receiver for $\lambda = 0.9$ $\mu$m should be at least $$P_{bit} = 10{,}000\, h\nu = 10{,}000\, h\frac{c}{\lambda} = \tag{17}$$

$$10{,}000(6.63)(10^{-34})\frac{3(10^{8})}{.9(10^{-6})} = 2.2(10^{-15})w$$

As stated earlier, the light source array consists of a set of LDs each with a divergence angle $\omega$. The spacing between two consecutive LDs in a diagonal LD array should be equal to $\sqrt{2}s$, where s is the space of two consecutive pixels in each matrix. After passing through the attached spherical and cylindrical lens combination, each of the LD illumination is focused to a vertical line of a length of 2f tan w/2 in the plane A, where f is the lens focal length. Since the LDs are oriented in a diagonal direction of the matrix, the location of these lines are shifted vertically from one another with a spacing of s, and the entire vertical displacement of M lines is (M−1)s. The same phenomenon appears but results in displaced horizontal lines in the second matrix plane B. Only the projected overlap regions between the vertical and horizontal lines can be used to illuminate both the data and CAM matrices. The line length on the planes A and B should be sufficiently long to cover the displacement length of (M−1)s in addition to the maximum length of the encoded data and the CAM matrix, whose dimension is (N+1)×M and M×M, respectively. In the case of N<M, the CAM matrix is larger, and the maximum dimension of the two matrices is M. Therefore, the line length must be at least (2M−1)s. While for N>M, the maximum dimension is (N+1), and the lines should be at least (N+M)s.

In case of N<M, each cell occupies a section which is 1/(2M−1) of the illuminated line length. Ignoring the reflection and absorption power losses of the employed optical components, the light power received by each cell on the plane A is 1/(2M−1) of the power emitted by an individual LD. Using the threshold level determined by Eq. 7, the detector is set to distinguish the ZERO and ONE intensity levels. The received optical power for intensity level ONE results from overlapping one "1" with M−1 "0"s, which originates from a single LD. Thus the received power per cell in level ONE is $$P_{rec} = \frac{P_{sour}}{(2M-1)^2}\eta \tag{18}$$

where $\eta$ is the system power utilization efficiency, and $P_{sour}$ is the power emitted by a single LD. The power efficiency $\eta$ is determined by the power reflection loss on the surfaces of the optical components as well as the power absorption loss in these optical components. Typically, the power loss in such a system is approximately in the range of 20% to 30%.

The EBR, is defined as the ratio of the power received by the detector ($P_{rec}$) to the power required per bit ($P_{bit}$), and can be expressed as $$EBR = \frac{P_{rec}}{P_{bit}} = \frac{P_{sour}\eta}{(2M-1)^2 P_{bit}} \tag{19}$$

Since for N>M, the power distributed to each cell in plane A is $P_{sour}/(N+M)$, the corresponding EBR can be evaluated as $$EBR = \frac{P_{rec}}{P_{bit}} = \frac{P_{sour}\eta}{(N+M)^2 P_{bit}} \tag{20}$$

Figure 14:
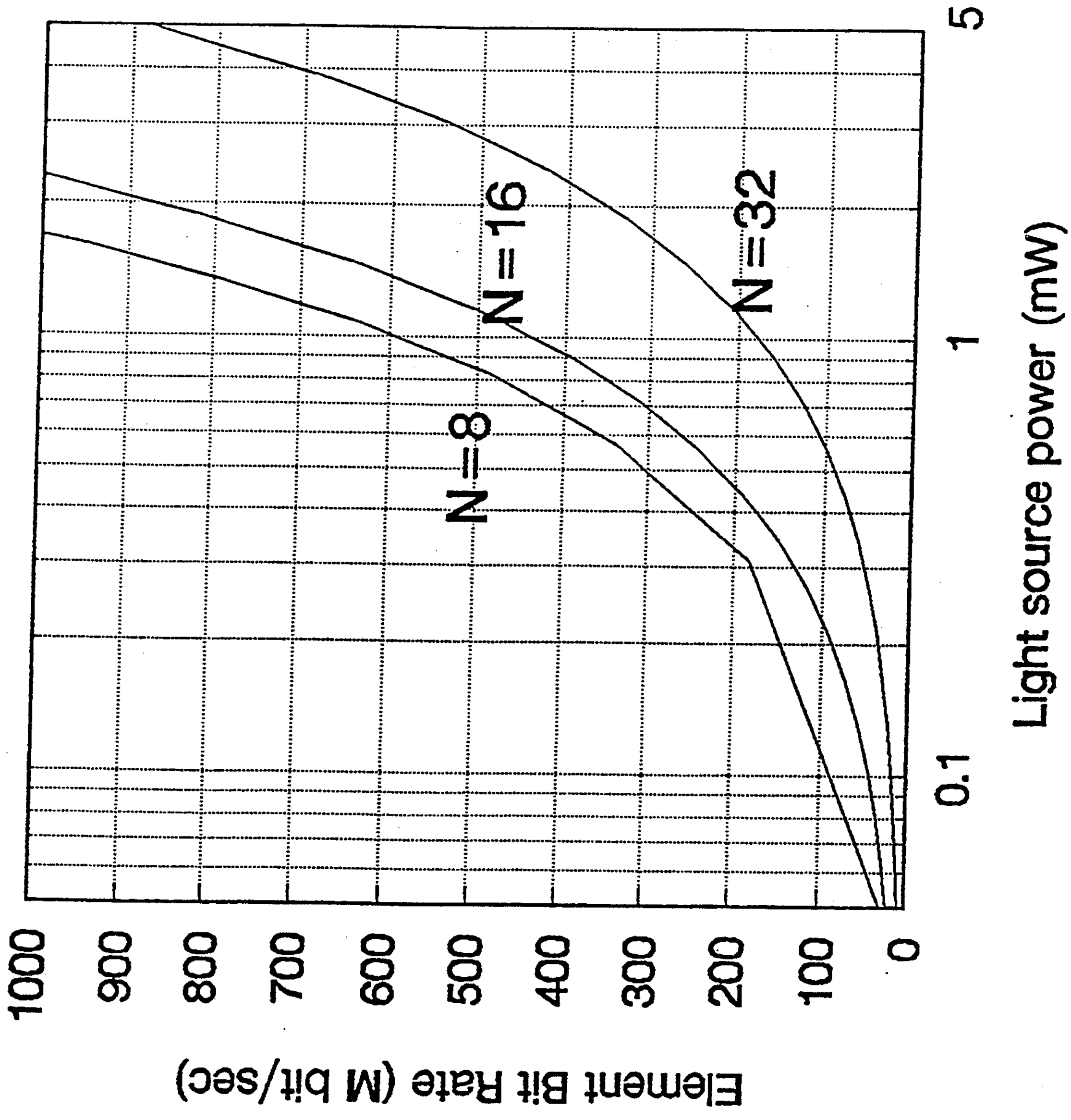
FIG. 14 is a graphical representation of the element-bit-rate (EBR) of the MSD adder, where N is the number of bits processed.

The EBR of a system with the LD's power in a range of approximately 10μW to 1 mW is shown in FIG. 14.

In order to further improve the power utilization efficiency, the SLM can be formatted so that each vertical line has a one pixel shift in the horizontal direction in order to form a parallelogram shape to match the illumination area by the LD array.

The above described MSD addition can always be performed using electronic circuitry. When the MSD addition is to be performed, a preferred electronics circuitry includes the use of custom-designed MSD three stage logic circuit which has a minimum processing delay and power.

To generate from two arbitrary MSD numbers a 1-bit MSD addition result for either 1 or −1, 18 binary AND operations followed by 28 binary OR operations must be used. The standard TTL PLA (programmable logic array ) is usually designed for a maximum of 20 logic AND inputs and performs a logic OR of a maximum of 16 internal variables. As a typical example, National Semiconductor PLA20C1 can generate from 20 TTL logic inputs a two level (AND-OR) logic output using a 20 AND and 16 OR combination. In order to incorporate the required 28 input logic OR in the present invention, two such units must be used in parallel. The PLA20C1 can process the specified logic operation in 40 ns and consumes only 0.5 W power. For generating each MSD addition bit, four such PLA's (two each for output 1 or −1) are used which consume approximately 2 W power and a little more than 40 ns in processing time. These figures can be improved if the ECL technology is used. Assuming that the delay of 40 ns can be equally divided between the AND and OR logic stages, use of standard TTL technology, logic AND of six variable logically reduced MSD addition input product terms or equivalently 18 encoded binary inputs requires approximately 20 ns.

Using the O-E CAM method of the present invention, the equivalent 18 variable AND operation is performed optically in a sequence beginning with a two variable multiplication (propagating optical signals through two consecutive planes), and then through a 18-variable summation (summing using the lens combination) operation, and ends with an active-low optical threshold detection. At present, to compress the three mentioned stages to within 20 ns is difficult, because the cycle time of a switchable optical pixel in a 2 D SLM itself will take perhaps more than 20 ns with reasonable power consumption. After the masks are setup, the actual delay time to perform the two variable optical multiplication and 18-variable optical summation results in a less than 1 ns of propagation delay. The active low threshold detection may also cause a delay of several nanoseconds, depending on the detector response time. After the 18-variable O-E AND operation is completed, the generated outputs will be logically ORed electronically. The same comparison can be also performed between using electronics and O-E methods for MSD using recoded inputs which do not contain consecutive 1's and −1's. In that case, the TTL series PLA16C1 which can generate 16-variable AND operations followed by 16-variable OR operations can be used to process 12-variable AND and 6-variable OR operations we need. The speed and power consumption for the PLA16C1 are 35 ns and 0.45 W, respectively.

The O-E CAM method with optical free-space propagation between the input, switching, and detection planes permits space-multiplexing. That is, optical beams carrying information from the same optical switching cell can travel different routes to different output channels. This occurs when N+1 CAM access operations physically share a single CAM storage mask. The sharing enables a reduction in the repetitive use of a large quantity of logic gates. The larger the value of N, the more efficient the shared CAM. However, N is limited by the optical power the system can deliver to sustain a specified EBR at an allowed BER.

An O-E S-CAM MSD adder was designed and tested. As the input source matrix components, twelve light emitting diodes (LEDs) (Panasonic P371-ND), each delivering an optical luminescence of 30 mcd at a center wavelength 590 nm, were mounted to a fiber plane containing twelve plastic fibers. Each fiber of 0.8 mm diameter was used to guide the light emitted from a LED. The twelve fibers formed a linear array of 19 mm in length. The linear fiber array was oriented 45° in the x-y plane to serve as the input matrix. Spherical and cylindrical lenses of two inches diameter and 150 mm focal length were used to build the matrix-matrix multiplier. Both the encoded input and the CAM MSD adder matrices were represented by binary masks whose cell size and spacing were set to be $1.1\times1.1$ $mm^2$ and 1.6 mm, respectively. The output signal was reduced by a standard f=50 mm camera lens to a CCD camera which was linked to a IBM PC-AT computer for post-processing and display.

Figure 15A:
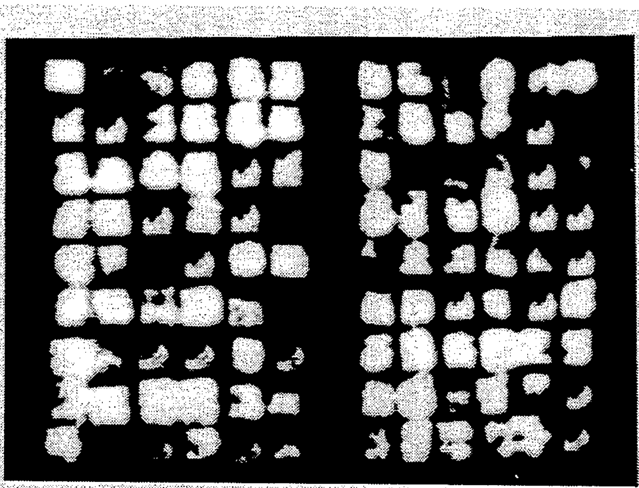
FIG. 15*a* shows an output matrix of the experimental result of an MSD addition $\mathbf{101010\bar{1}0+100100\bar{1}0=100111\bar{1}00}$ before threshold operation.
Figure 15B:
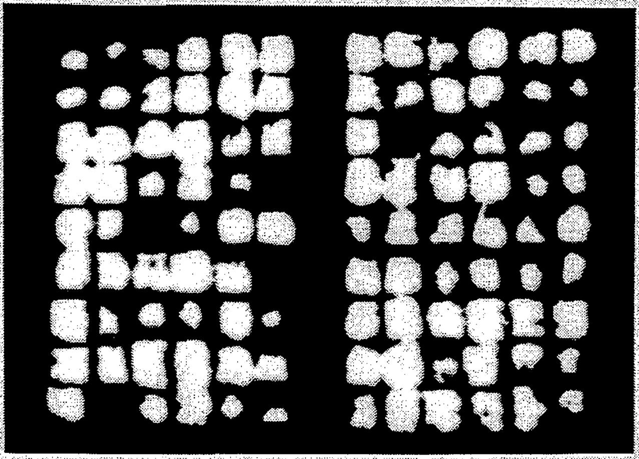
FIG. 15*b* shows the output matrix of FIG. 15*a* after threshold operation.
Figure 16A:
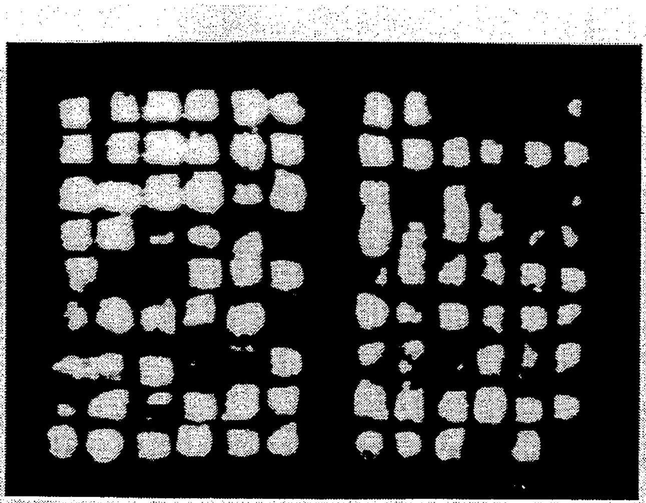
FIG. 16*a* shows an output matrix of the experimental result of a MSD subtraction $\mathbf{101010\bar{1}0-100\bar{1}0010=101010\bar{1}0+\bar{1}00100\bar{1}0=00111\bar{1}00}$ before threshold operation.
Figure 16B:
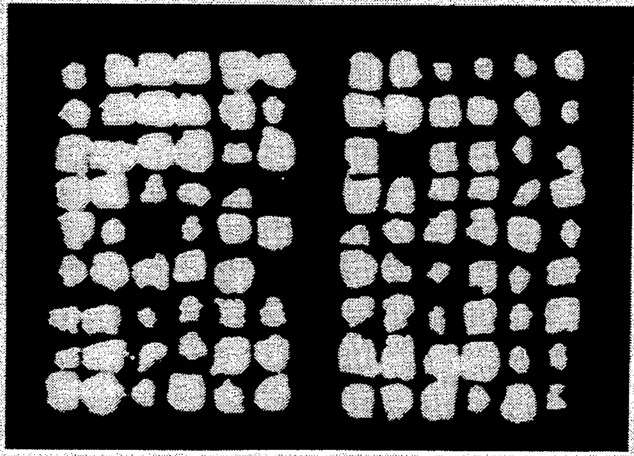
FIG. 16*b* shows the output matrix of FIG. 16*a* after threshold operation.

Using an identical CAM MSD adder mask for the matrix plane B, both MSD addition and subtraction operations were experimentally tested. The CAM MSD adder mask contained two side-by-side matrices each of a dimension $12\times6$. As the example for the MSD addition, the two input numbers to be added were selected as 166 and 142. The two numbers were coded to their MSD forms: $\mathbf{101010\bar{1}0}$ and $\mathbf{100100\bar{1}0}$. The two MSD numbers were further triple-rail encoded to form the input matrix A according to the rules described above. The output matrix which was further divided into two matrices each of the size $9\times6$ cells was acquired by the CCD camera and stored in the computer. In FIG. 15(*a*) and (*b*), the raw data at the output matrix before thresholding and the data after the threshold operation respectively are shown. Intensity ZERO's were detected at the lines 4, 5, 6 and 9 of the matrix for output "1" and line 3 of the matrix for output "−1". A combination of the results of the two matrices indicate that the final MSD addition yields an output $\mathbf{100111\bar{1}00}$ which is 308. The subtraction experiment was treated as 166+(−114) or in its MSD form $\mathbf{101010\bar{1}0}+\mathbf{\bar{1}00100\bar{1}0}$. A mask containing the triple-rail encoded information of this input combination at the plane A produced an optical matrix product result before thresholding as shown in FIG. 16(*a*), and the result after a threshold operation is shown in FIG. 16(*b*). Again, by counting at ZERO's, we found their locations at lines 4, 5 and 6 at the matrix for "1" and at line 3 at the matrix for "−1". A combination of the two results yields the final subtraction result $\mathbf{000111\bar{1}00}$ which is 52.

The present invention concerns a novel O-E scheme to perform parallel MSD addition and subtraction. Instead of using a conventional three stage MSD logic circuit, a single stage MSD addition/subtraction based on a CAM look-up operation is used. In order to perform a large quantity of parallel pattern matching sub-operations, a free-space optical CAM space shared geometry is used which results in hardware reduction by the use of an array of CAM devices as compared to the use of a single S-CAM. The S-CAM can be mathematically described as a matrix-matrix multiplication followed by a threshold operation and other simple logic operations. To physically construct the O-E S-CAM, in a preferred embodiment optics and electronics are used to handle the operations for which each is best suited, e.g. using optics to form the matrix-matrix product in analog format and using electronics to perform threshold and logic operation on the obtained results. For the optical matrix-matrix multiplier, two simple optical setups which perform triple-matrix multiplications were described. Based on this triple-matrix multiplier, an O-E S-CAM MSD adder architecture was described. Design strategies to implement a S-CAM with extremely low CTR was also described. In addition, power efficiency of the proposed optical sub-system was also described and maximum allowable power-limited S-CAM repetition rate was estimated. Experiments to perform 8-bit MSD additions and subtractions were designed and tested to confirm the viability of the synchronized parallel arithmetic and logic operations under SIMD environment.

It will be apparent to those skilled in the art that further variations and modifications are possible without deviating from the broad principle and spirit of the present invention and shall be limited solely by the scope of the claims appended hereto.

What is claimed is:

1. An opto-electronic shared content-addressable memory processor comprising:

an input matrix containing optical data associated with MSD numbers to be arithmetically combined;

a MSD S-CAM matrix;

an output matrix containing data corresponding to optical matrix multiplication of said input matrix data and said MSD S-CAM matrix matrices; and means coupled to said output matrix for converting the data in said output matrix to obtain MSD result of the numbers arithmetically combined.

2. An opto-electronic shared content-addressable memory processor as set forth in claim 1, further comprising illumination means for passing light through said input matrix and said MSD S-CAM matrix to said output matrix.

3. An opto-electronic shared content-addressable memory processor as set forth in claim 2, wherein said illumination means comprises a laser diode.

4. An opto-electronic shared-content-addressable memory processor as set forth in claim 1, further comprising an identity matrix containing only unit values data along said identity matrix main diagonal entries.

5. An opto-electronic shared content-addressable memory processor as set forth in claim 4, further comprising illumination means for passing light through said identity matrix, said input matrix and said MSD S-CAM matrix to said output matrix.

6. An opto-electronic shared content-addressable memory processor as set forth in claim 5, further comprising a first cylindrical lens juxtaposed to a first spherical lens disposed along a path from said identity matrix to said output matrix a distance of one focal length from said identity matrix and one focal length from said input matrix; a second spherical lens juxtaposed to said input matrix; a third spherical lens disposed along said path at a distance of one focal length from said input matrix; said MSD S-CAM matrix juxtaposed to said third spherical lens; a second cylindrical lens and a fourth spherical lens in juxtaposition disposed along said path at a distance of one focal length from said MSD S-CAM matrix and disposed at a distance of one focal length from said output matrix.

7. An opto-electronic shared content-addressable memory processor as set forth in claim 5, further comprising first spherical lens and a first cylindrical lens in juxtaposition disposed along a path from said identity matrix to said output matrix a distance one focal length from said identity matrix and one focal length from said input matrix; a second spherical lens disposed along said path a distance of one focal length from said input matrix and one focal length from said MSD S-CAM matrix, a second cylindrical lens and a third spherical lens in juxtaposition disposed along said path a distance of one focal length from said MSD S-CAM matrix and one focal length from said output matrix.

8. An opto-electronic shared content-addressable memory processor as set forth in claim 1, wherein said input matrix comprises a first spatial light modulator and said MSD S-CAM matrix comprises a second spatial light modulator.

9. An opto-electronic shared content-addressable memory processor as set forth in claim 8, further comprising an input laser array, a first cylindrical lens and a first spherical lens in juxtaposition disposed one focal distance from said input laser array; a first polarizing beam splitter disposed in a path from said first spherical lens and first cylindrical lens and a first spatial light modulator one focal length from said first lenses; a first quarter-wave plate disposed in a path between said first polarizing beam splitter and said first spatial light modulator; a second spherical lens disposed one focal length from said first spatial light modulator; a second polarizing beam splitter disposed in a path between said second spherical lens and said second spatial light modulator disposed one focal length from said second spherical lens; a second quarter-wave plate disposed in the path between said second polarizing beam splitter and said second spatial light modulator, and a third spherical lens and a second cylindrical lens in juxtaposition disposed one focal length from said spatial light modulator and one focal length from said output matrix.

10. An opto-electronic shared content-addressable memory processor as set forth in claim 1, further comprising an input laser array, a first cylindrical lens and a first spherical lens in juxtaposition disposed one focal distance from said input laser array; a first polarizing beam splitter disposed in a path from said first spherical lens and said first cylindrical lens to said input matrix comprising a spatial light modulator disposed one focal length from said first lenses; a first quarter-wave plate disposed in the path between said first polarizing beam splitter and said input matrix; a second spherical lens disposed one focal length from said input matrix; a second polarizing beam splitter disposed in a path between said second spherical lens and said S-CAM matrix disposed one focal length from said second spherical lens; a second quarter-wave plate disposed in the path between said second polarizing beam splitter and said S-CAM matrix; and a third spherical lens and a second cylindrical lens in juxtaposition disposed along a path from said S-CAM matrix to said output matrix at a distance of one focal length from said S-CAM matrix; and said output matrix disposed one focal length from said second cylindrical lens and said third spherical lens.

11. An opto-electronic shared content-addressable memory processor as set forth in claim 1, wherein said means coupled to said output matrix comprises threshold means for determining the level of said data in said output matrix and logic means for obtaining said result from said level of said data in said output matrix.

12. A method of performing optical modified signed-digit arithmetic operations of two numbers comprising the steps of:

converting a first number into electrical data in a first register;

converting a second number into electrical data in a second register;

forming an input matrix containing optical data commensurate with said data in said first register and in said second register;

providing a S-CAM matrix containing data commensurate with generating logic values, 1, 0, and −1;

providing an output matrix for containing data commensurate with the optical multiplication of said input matrix and said S-CAM matrix;

and processing said data in said output matrix for obtaining the result of the arithmetic operation of said first number and said second number.

13. A method of performing optical modified signed-digit arithmetic operations as set forth in claim 12, further comprising providing an identity matrix containing only unit values data along said identity matrix main diagonal entries.

14. A method of performing optical modified signed-digit arithmetic operations as set forth in claim 13, further comprising illuminating a path through said identity matrix said input matrix, and said S-CAM matrix to said output matrix.

15. A method of performing optical modified signed-digit arithmetic operations as set forth in claim 14, wherein said processing said data comprises applying a threshold to each bit of said data to determine the level of said data and performing logic operation on threshold data to obtain said result.

* * * * *